United States Patent [19]

Fukuhara et al.

[11] Patent Number: 4,476,383
[45] Date of Patent: Oct. 9, 1984

[54] PHOTOMETERING DEVICE FOR OBTAINING EXPOSURE INFORMATION

[75] Inventors: Toru Fukuhara, Isehara; Takashi Saegusa, Sagamihara, both of Japan

[73] Assignee: Nippon Kogaku K.K., Tokyo, Japan

[21] Appl. No.: 391,864

[22] Filed: Jun. 24, 1982

Related U.S. Application Data

[63] Continuation of Ser. No. 123,209, Feb. 21, 1980, abandoned.

[30] Foreign Application Priority Data

| Feb. 28, 1979 | [JP] | Japan | 54-23019 |
| Feb. 28, 1979 | [JP] | Japan | 54-23020 |
| Feb. 28, 1979 | [JP] | Japan | 54-23021 |
| Feb. 28, 1979 | [JP] | Japan | 54-24087[U] |
| Feb. 28, 1979 | [JP] | Japan | 54-24088[U] |

[51] Int. Cl.³ .................................................. G01J 1/44
[52] U.S. Cl. ............................... 250/214 P; 354/432; 356/222
[58] Field of Search .................. 250/209, 214 P; 356/222, 226; 354/31 R, 43, 50, 60 R, 432

[56] References Cited

U.S. PATENT DOCUMENTS

| 3,717,077 | 2/1973 | Harvey | 354/31 |
| 3,772,517 | 11/1973 | Smith | 356/226 X |
| 4,214,826 | 7/1980 | Uchida et al. | 356/222 X |

FOREIGN PATENT DOCUMENTS

| 1222787 | 8/1966 | Fed. Rep. of Germany . |
| 9271 | 3/1976 | Japan . |
| 17725 | 2/1978 | Japan . |
| 1151350 | 5/1969 | United Kingdom . |
| 1176394 | 1/1970 | United Kingdom . |
| 1352440 | 5/1974 | United Kingdom . |

*Primary Examiner*—David C. Nelms
*Assistant Examiner*—Edward P. Westin
*Attorney, Agent, or Firm*—Fitzpatrick, Cella, Harper & Scinto

[57] ABSTRACT

A multi-metering device comprises division of an object field into a plurality of areas and metering said plurality of areas and generating a plurality of photoelectric outputs corresponding to said plurality of areas, a binary circuit for standardizing said plurality of photoelectric outputs by the average output of said plurality of photoelectric outputs, and a classifying circuit for classifying the object field on the basis of said standardized outputs and operating and extracting a proper metering output by the classifying output.

19 Claims, 19 Drawing Figures

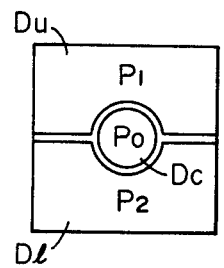
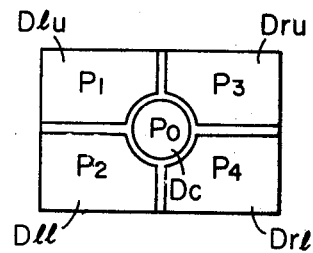
FIG. 3A        FIG. 3B
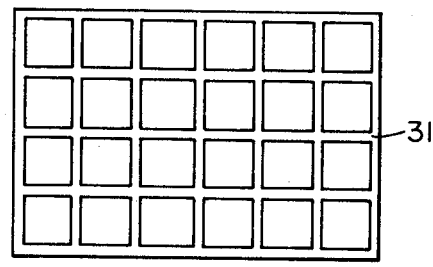
FIG. 4
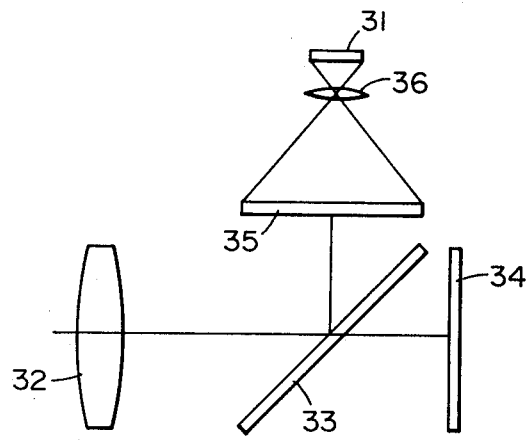
FIG. 5

PHOTOMETERING DEVICE FOR OBTAINING EXPOSURE INFORMATION

This is a continuation of application Ser. No. 123,209, filed Feb. 21, 1980, now abandoned.

BACKGROUND OF THE INVENTION

1. Field of the Invention

This invention relates to a multi-metering device for dividing an object field or scene into a plurality of areas and metering the plurality of areas and operating and extracting, from a plurality of photoelectric outputs corresponding to said plurality of areas, a proper metering output for determining the proper exposure of an entire picture plane.

2. Description of the Prior Art

As a metering device of such type, there has been known a device in which the arithmetical mean value of the maximum value and the minimum value of a plurality of photoelectric outputs is used as a proper metering output (Japanese Utility Model Publication No. 9271/1976), or a device in which an intermediate value between said maximum value and said minimum value is manually extracted by the photographer and such intermediate value is used as a proper metering output (Japanese Laid-open patent application No. 17725/1978).

However, these devices according to the prior art suffer from the following disadvantages. In the former device, the exposure is determined by the arithmetical mean value and therefore, for example, in the case of counter-light condition or a special object field condition in which the major object lies on snow, for example, the major object may sometimes become under-exposed or over-exposed. Also, in the latter device, not only is skill required to set the intermediate value so as to provide a proper exposure in the case of the aforementioned special object field condition, but also the setting operation is manually effected and so, when the device is mounted in a camera, the operability thereof is unavoidably reduced.

Further, there is a device in which the exposure determining mode is changed over depending on whether or not the difference between the maximum value and the minimum value of the photoelectric outputs has exceeded a certain value (U.S. Pat. No. 4,214,826), but it is often impossible to judge the condition of the object merely from the brightness difference in the picture plane. For example, between the case of a counter-light scene in which the sun is photographed and the case of theatrical stage photography effected under a spot light, the brightness difference in the picture plane is of the same degree, but a proper exposure cannot be obtained unless the exposure determining systems are made different. In such case, it is necessary to use the maximum brightness value in the picture plane as the material for judgment and to judge by what kind of object that high brightness is being created.

Incidentally, as the reason why the object field is divided into a plurality of areas and the plurality of areas are metered, it may be mentioned that a proper exposure is obtained even in counterlight photography. However, when a high brightness portion such as the sun has come into the picture plane, an under-exposure photograph has resulted according to the conventional devices. This is because, although the high brightness portion occupies only a part of the picture plane, the absolute amount of its brightness is greater than that of the major object and even if the brightnesses of the two is averaged, the average value becomes considerably greater than the brightness of the major object.

On the other hand, where a plurality of photoelectric outputs corresponding to the plurality of areas are obtained, part of the picture plane is below the lower limit of metering but the remaining portion can sometimes be metered. For example, this occurs in a case where the object is illuminated by a spot light. The conventional devices have been almost ineffective for this.

Further, where the contrast in the picture plane is high, if the exposure is controlled for the high brightness portion or for the low brightness portion, there may result a photograph in which the low brightness portion or the high brightness portion has been defaced so as to give a sense of unpleasantness to the viewer of the photograph.

SUMMARY OF THE INVENTION

It is an object of the present invention to provide a multi-metering device which is designed to analyze the conditions of the object field on the basis of photoelectric outputs and to enable a proper metering output to be obtained even for the aforementioned special condition, particularly for an object field of which the major object exists in a dark portion.

The invention will become fully apparent from the following detailed description thereof taken in conjunction with the accompanying drawings.

BRIEF DESCRIPTION OF THE DRAWINGS

FIGS. 3A and 3B show the manner of division of the picture plane and the photoelectric outputs of the divided areas.

FIG. 4 shows an arrangement of photoelectric elements.

FIG. 5 shows an example of the light-receiving optical system.

FIG. 14 shows an example of the average value detecting circuit.

DESCRIPTION OF THE PREFERRED EMBODIMENTS

The basic concept of the present invention will hereinafter be described with reference to FIG. 1 in which the object field (hereinafter referred to as the picture plane) is the base and the brightness of various portions of the picture plane is the height (vertical axis) and which represents the picture plane and the brightness of various portions of the picture plane in the form of a solid figure.

Figure 1A:
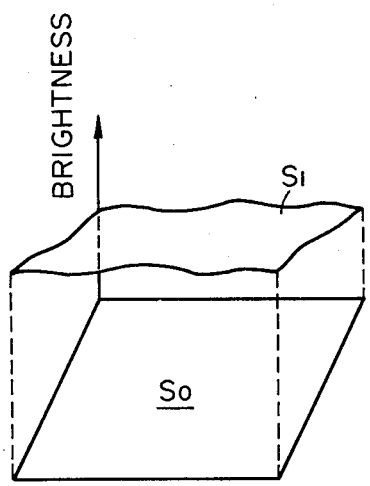
FIG. 1A, 1B and 1C illustrate the basic concept of the present invention.
Figure 1B:
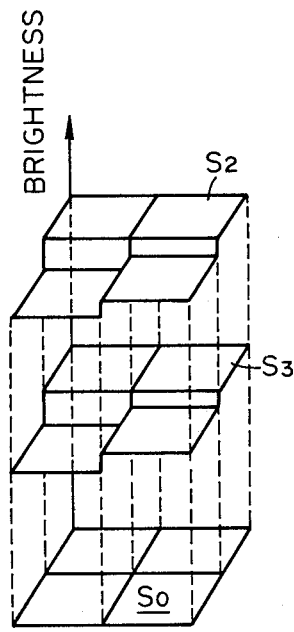
Figure 1C:
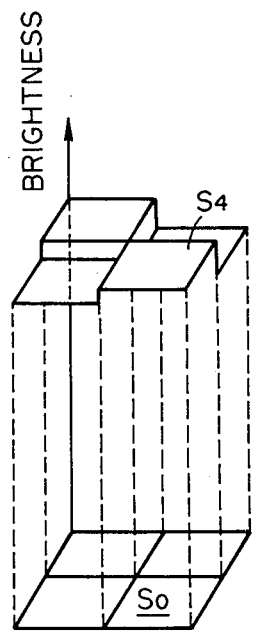

In FIG. 1A, when the picture plane as shown by the base $S_0$ is considered, the brightness of the picture plane determines a curved surface $S_1$. Actually, metering is effected by a limited number of photoelectric elements and therefore, the curved surface which can be seized becomes a congregation of planes equal to or smaller than the number of photoelectric elements. For example, where the picture plane is divided into top, bottom, left and right by four photoelectric elements, the curved surface indicative of the brightness of the picture plane is quantized as shown by quantized surfaces $S_2$ through $S_4$ in FIGS. 1B and 1C and assumes a stepped configuration. When the quantized surfaces $S_2$ and $S_4$ are compared with each other, the absolute levels of the brightnesses constituting the quantized surfaces are identical to each other but the positions thereof on the picture plane differ from each other and therefore, the judgment as to the brightness for which a proper exposure is to be obtained also becomes different. When the quantized surfaces $S_2$ and $S_3$ are compared with each other, the level differences between adjacent brightnesses are equal but the absolute values of the brightnesses between the two quantized surfaces are different and therefore, the judgment for obtaining a proper exposure also becomes different. Now, the phototaking picture plane under all conditions is classified into a plurality of categories by the information regarding the brightness and the information regarding the position, and a correspondence is determined as to whether a proper exposure can be obtained as a whole if exposure control can be obtained as a whole if exposure control is effected for brightness in each of the categories. Then, the brightness for which exposure control is to be effected in the picture plane under a certain condition can be obtained from the information regarding the brightness and the information regarding the position.

In fact, as the result of said correspondence having been determined regarding the picture plane under various conditions, it has been found that the brightness for which exposure control is to be effected to obtain a photograph with proper exposure converges into the following three levels. That is, it has been found that a first brightness level exists between the maximum value of a plurality of metering outputs and the average value of these metering outputs, that a second brightness level is a level substantially coincident with the avarage value of these metering outputs and that a third brightness level exists between the minimum value of these metering outputs and the average value of these metering outputs. This average value can be approximate to the mean value, the central value or the most frequent value.

From the foregoing, it is seen that if the average value of a plurality of photoelectric outputs is obtained and each of the photoelectric outputs are compared with each other and the brightness on each divided picture plane is standardized, the information regarding the position of each picture plane and the information regarding the brightness can be obtained at one time. Accordingly, if pattern analysis is effected on the basis of this standardized output to detect the state of the picture plane and this detection result and said three brightness levels are experimentally or empirically made to correspond to each other, it is possible to select the brightness level to be exposure-controlled for the picture plane under various conditions.

On the other hand, the brightness level to be exposure-controlled is sometimes determined independently of the pattern analysis. It is the case where the difference between the maximum brightness and the minimum brightness is within a predetermined range and the irregularity of the brightness in the picture plane is small and exists within a predetermined range of the maximum brightness and it can be judged that there is not present a bright light source such as the sun or an artificial light source such as a spot light in the picture plane. In such a case, it has been found that if exposure adjustment is effected for said second brightness level, a good result can be obtained.

On the other hand, where there is present in the picture plane a high brightness portion represented by the sun or a low brightness portion below the lower limit of metering, if the maximum value corresponding to the high brightness portion and the minimum value corresponding to the low brightness portion below the lower limit of metering are neglected in the level setting of said first to third brightness levels or these maximum and minimum values are substituted for by other brightnesses existing in the picture plane, there can be obtained proper metering information which is not affected by extremely high and low brightnesses.

Figure 2:
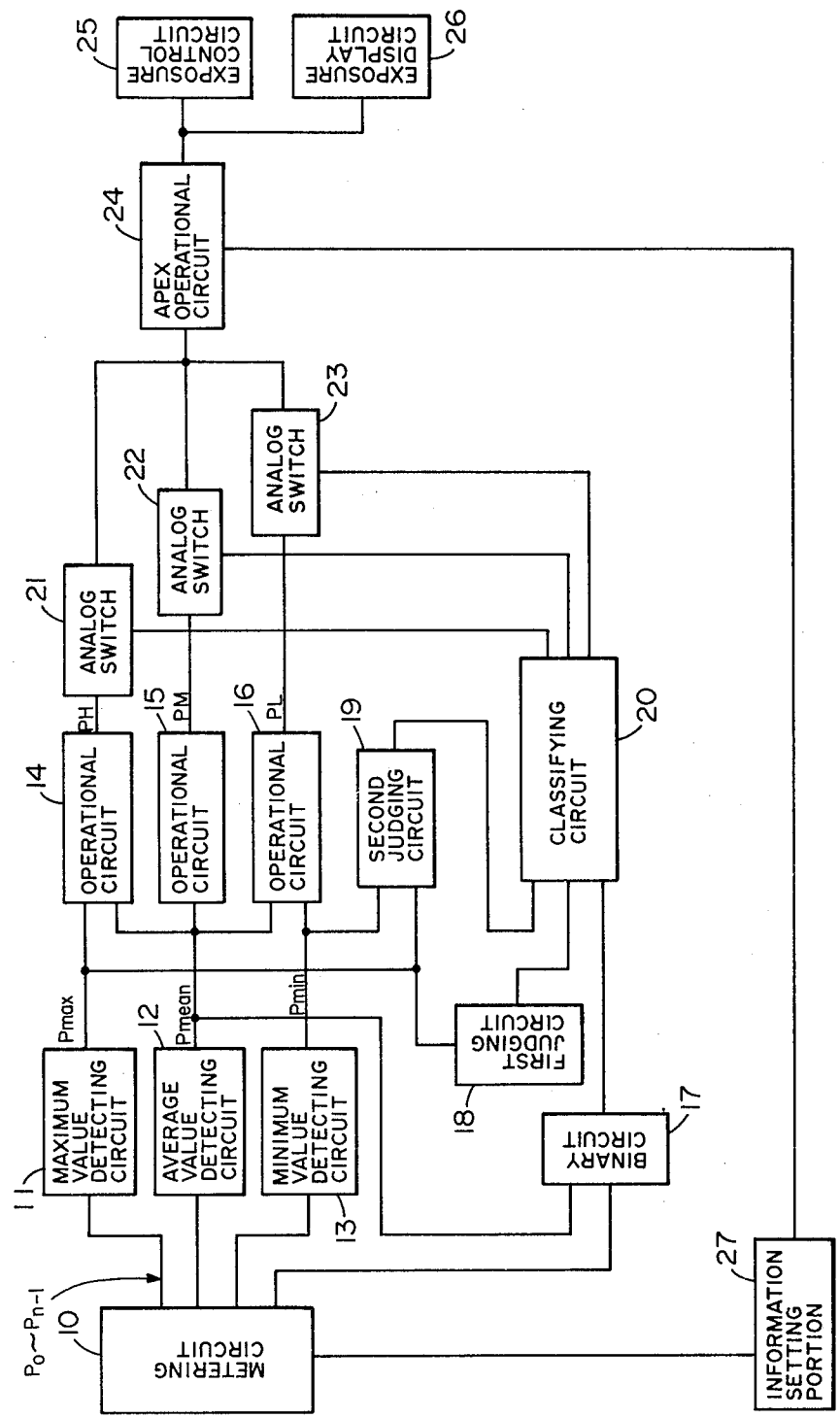
FIG. 2 is a block diagram showing an embodiment of the present invention.

The present invention will hereinafter be described with respect to embodiments thereof. FIG. 2 is a block diagram showing an embodiment of the present invention. In FIG. 2, a metering circuit 10 includes photoelectric converting elements for metering various areas obtained by dividing the object field into a plurality of area and puts out independent analog photoelectric outputs Po through $P_{n-1}$ corresponding to the various areas of the object field. It is to be understood that these photoelectric outputs Po through $P_{n-1}$ have been logarithmically compressed and accordingly, the photoelectric outputs are represented by BV values. A maximum value detecting circuit 11 receives the photoelectric outputs Po through $P_{n-1}$ as input and detects a maximum value $P_{max}$ from among these. An average value detecting circuit 12 receives the photoelectric outputs Po through $P_{n-1}$ as input and detects the average value of these, for example, a mean value $P_{mean}$. A minimum value detecting circuit 13 receives the photoelectric outputs Po through $P_{n-1}$ as input and detects a minimum value $P_{min}$ from among these. An operational circuit 14 receives the maximum value $P_{max}$ and the mean value $P_{mean}$ as input and generates a first metering output PH(BV), that is, $$PH = k_1 P_{max} + (1-k_1) P_{mean} \quad (1)$$

($P_{max} > PH > P_{mean}$; $k_1$ is constant).

An operational circuit 15 generates a second metering output PM(BV), that is, $$PM = P_{mean} \quad (2)$$

but actually, it can be used in common with the average value detecting circuit 12. An operational circuit 16 receives the minimum value $P_{min}$ and the mean value $P_{mean}$ as input and generates a third metering output PL(BV), that is, $$PL = k_2 P_{min} + (1-k_2) P_{mean} \quad (3)$$

($P_{mean} > PL > P_{min}$; $k_2$ is constant).

The above-described circuits 11–16 together constitute a proper metering output generating circuit.

A binary circuit 17 is a portion for effecting the standardization and receives the photoelectric outputs $P_0$ through $p_{n-1}$ and the mean value $P_{mean}$ as input and compares a standard output generated on the basis of the mean value $P_{mean}$ with the metering outputs $P_0$ through $P_{n-1}$ and converts each of the photoelectric outputs into a logic output. Here, the standardization refers to detecting the magnitude relationship of each photoelectric output with the average value of the plurality of photoelectric outputs and substituting for a specific signal each photoelectric output in accordance with the matnitude thereof.

Specifically, in the embodiment, the binary circuit compares the output $P_i$ of the ith position with the mean value $P_{mean}$ and renders it into 1 if $P_i \geq P_{mean}$ and renders it into 0 if $P_i < P_{mean}$. If the standardized output is 1, it indicates that the ith position is a portion lighter than the average, and if the standardized output is 0, it indicates that the ith position is a portion darker than the average. That is, the aforementioned standardization assumes a binary form.

Also, the following can be done: a method of setting $P_{mean} + \delta H$ and $P_{mean} - \delta L$ as the standard outputs based on the mean value $P_{mean}$ to divide the entire brightness into a light portion, a dark portion and an intermediate portion and transforming it into binary form for these two standard levels. That is, it is rendered into 1 when $P_i > P_{mean} + \delta H$ is established, it is rendered into 0 when $P_i \leq P_{mean} + \delta H$ is established, it is rendered into 1 when $P_i \geq P_{mean} - \delta L$ is established, and it is rendered into 0 when $P_i < P_{mean} - \delta L$ is established. In this case, the binary output of the ith position becomes 2 bits.

When the outputs are placed in the order of comparison between $P_{mean} + \delta H$ and $P_{mean} - \delta L$, if the output is 11, it indicates a light portion, and if the output is 00, it indicates a dark portion, and if the output is 01, it indicates a portion approximate to the intermediate mean value (the case of 10 does not exist). By so dividing the brightness of that position into three stages, a higher degree of pattern analysis becomes possible.

Of course, it is also possible to divide the binary circuit into four or more stages and the manner of division may be changed in accordance with the position.

Next, a first judging circuit 18 receives the maximum value $P_{max}$ as input and effects the judgment of $$P\alpha \leq P_{max} \leq P\beta \quad (P\alpha \text{ and } P\beta \text{ are constants}) \quad (4)$$

and generates a logic output representing the result of the judgment. Of course, the first judging circuit 18 includes a circuit for generating standard outputs corresponding to $P\alpha$ and $P\beta$. This judging operation is effected to discriminate whether the maximum value $P_{max}$ is attributable to a bright light source including the sun or to an artificial light source such as a spot light. A second judging circuit 19 receives the maximum value $P_{max}$ and the minimum value $P_{min}$ as input and effects the operation of $$\Delta P = P_{max} - P_{min} \quad (5)$$

and then effects the judgment of $$\alpha \leq \Delta P \leq \beta \quad (\alpha \text{ and } \beta \text{ are constants}) \quad (6)$$

and generates a logic output representing the result of the judgment. Of course, a circuit for generating standard outputs corresponding to the constants $\alpha$ and $\beta$ is included in the second judging circuit 19. This judging operation is effected to judge the brightness distribution in the picture plane and prevent a phenomenon that, for example, when the brightness distribution is great, the high brightness side jumps if the exposure is adjusted to the low brightness side by the reason that the major object lies on the low brightness side and conversely, the low brightness side collapses if the exposure is adjusted to the high brightness side by the reason that the major object lies on the high brightness side A classifying circuit 20 receives, as input, the logic outputs from the circuits 17, 18 and 19 and determines or classifies to which of predetermined categories the combination logic of these logic outputs belongs. There are three such predetermined categories and a control output corresponding to each of the categories is selectively generated. Analog switches 21, 22 and 23 connected between the circuits 14, 15, 16 and an apex operational circuit 24, respectively, select an output corresponding to the category classified from among the first to third metering outputs by the control output of the classifying circuit 20 and transmits the same to the apex operational circuit 24.

The apex operational circuit 24 generates an output corresponding to a proper exposure value (shutter speed and aperture value) by the selected metering output and other exposure factor from an information setting portion 27 and applied the same to a known exposure control circuit 25 and an exposure display circuit 26.

The operation and the mode of classification by the classifying circuit 20 will now be described with respect to a case where metering is effected with the picture plane divided into three and five, respectively. FIGS. 3A and 3B show the manner in which the picture plane is divided and the photoelectric outputs of the divided areas.

(1) In FIG. 3A, the picture plane is divided into a central area Dc, an upper area Du and a lower area Dl by supposing a 6×6 format camera, and the photoelectric outputs of these areas are represented by $P_0$ through $P_2$.

Each of the photoelectric outputs $P_0$ through $P_2$ is compared with the mean value $P_{mean}$ ($=(P_0+P_1+P_2)/3$), and each area is represented by logic value 1 when $P_0$ through $P_2 \geq P_{mean}$ and represented by logic value 0 when $P_0$ through $P_2 < P_{mean}$. The classifying circuit 20 closes the analog switch 23 to transmit the third metering output PL to the apex operational circuit 24 when the combination of the logic values is such that (i) the central area Dc is 0 or the lower area Dl is 0 (because, at this time, there is a high probability that the major object exists in the area Dc or Dl), and closes the analog switch 21 to transmit the first metering output PH to the apex operational circuit 24 when the combination of the logic values is such that (ii) the central area Dc is 1 (because, at this time, there is a high probability that the major object exists in the area Dc).

On the other hand, the first judging circuit 18 generates an output of logic value 1 when $P\alpha \leq P_{max} \leq P\beta$, and generates an output of logic value 0 during the other time. The second judging circuit 19 generates an output of logic value 1 when $\alpha \leq \Delta P \leq \beta$, and generates an output of logic value 0 during the other time. When the logic value 1 has been applied from the first and second judging circuits 18 and 19, even if the picture plane is in the above mentioned state (i) or (ii), the classifying circuit 20 closes the analog switch 22 to transmit the second metering output PM to the apex operational circuit 24.

(2) In FIG. 3B, the picture plane is divided into a central area Dc, a right upper area Dru, a left upper area Dlu, a right lower area Drl and a left lower area Dll by supposing a Leika format camera, and the photoelectric outputs of these areas are represented by $P_0$ through $P_4$. Each of these photoelectric outputs $P_0$ through $P_4$ is compared with the means value $P_{mean}$ in the same manner as described above, and each area is represented by logic value 1 or 0. The classifying circuit 20 closes the analog switch 23 to transmit the third metering output PL to the apex operational circuit 24 when the combination of the logic values is such that (i) the central area Dc is 0, or the left and right lower areas Dll and Drl are 0, or the left upper area Dlu and the left lower area Dll are 0, or the right upper area Dru and the right lower area Drl are 0 (because at this time, there is a high probability that the major object exists in the area of 0). During the other time, the operation is the same as what has been described under item (1) above. This example of the division into five takes it into consideration that there are lengthwise and breadthwise photographing positions as in the Leika format camera.

The thus extracted metering output is apex-operated and applied to the exposure control circuit 25 and the exposure display circuit 26. In the present embodiment, the apex-operation is effected after the extraction of the metering output, whereas it is not limited thereto but the photoelectric outputs may be immediately apex-operated and transmitted to the circuits 11 through 13 and 17. In this case, the output levels after the plurality of photoelectric outputs have been apex-operated are varied, but the magnitude relation between the output levels is not varied and therefore, an operation similar to what has been previously described can be effected. The first to third metering outputs come to represent from BV values to TV values or AV values.

Further, in the present emboidment, the first to third metering outputs are operated and the result of that operation is extracted, but the same effect can also be achieved by selecting the operation formulas of equations (1) through (3), for example. This is because eventually it suffices if any one of the first to third metering outputs is selected.

Also, the standardization is not restricted to the substitution of the photoelectric outputs for two levels, but for example, two standard levels may be provided in the vicinity of the mean value and the photoelectric outputs may be transformed into binary form with respect to the respective standard levels, thereby setting the photoelectric output in the vicinity of the mean value to another level.

The construction of each block will hereinafter be described. FIG. 4 shows an example of the photoelectric elements. In FIG. 4, a plurality of photoelectric elements are arranged and these may be provided by a photodiode array or CCD. However, the photoelectric elements need not always be in a matrix form. By synthesizing the outputs of these photoelectric elements, the photoelectric outputs in the above-described divided area can be obtained.

FIG. 5 shows an example of the light-receiving optical system. Designated by 31 is the plurality of photoelectric elements shown in FIG. 4. Reference numeral 33 designates a mirror, 34 a film surface, 35 a finder secreen and 36 a lens for causing the object image formed on the finder screen to be re-imaged on the surface of a light-receiving element.

By the above-described construction, it is possible to measure the brightness of each portion of a scene to be photographed and to take out a plurality of bits of independent metering information.

Figure 6A:
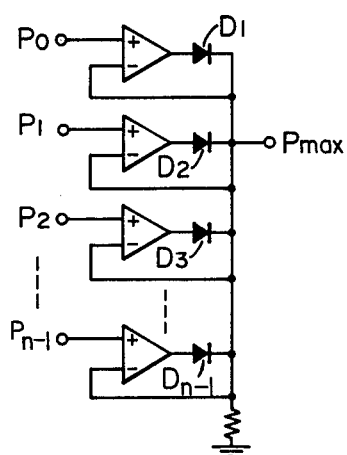
FIG. 6A shows an example of the maximum value detecting circuit.
Figure 6B:
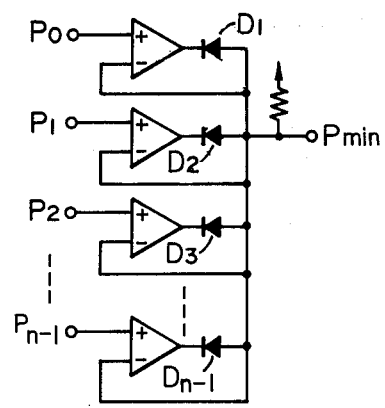
FIG. 6B shows an example of the minimum value detecting circuit.

FIG. 6A shows an example of the maximum value detecting circuit 11 and FIG. 6B shows an example of the minimum value detecting circuit 13. These circuits use operational amplifiers and ideal diodes and are known per se.

Figure 7:
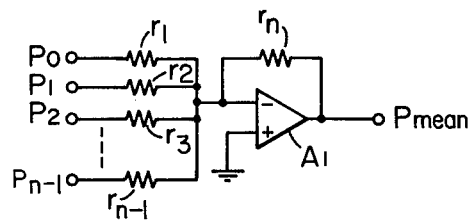
FIG. 7 shows an average value detecting circuit.

FIG. 7 shows the mean value detecting circuit 12 which comprises resistors $r_1$ thorugh $r_{n-1}$ of resistance $r$ and resistor $r_m$ of resistance $r/n$ and an operational amplifier $A_1$ and in this circuit, an output $(P_0+P_1 \cdots P_{n-1})/n = P_{mean}$ is obtained as the output of the operational amplifier.

Figure 8:
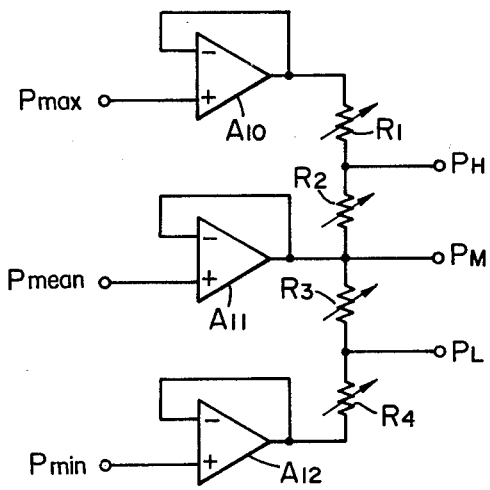
FIG. 8 shows examples of the operational circuits

FIG. 8 shows examples of the operational circuits 14, 15 and 16, which comprise followers $A_{10}$ thorugh $A_{12}$ and volrage dividing resistors $R_1$ through $R_4$. By adjusting the voltage dividing ratio, the first to third metering outputs PH, PM and PL can be obtained to satisfy the aforementioned equations (1), (2) and (3).

Figure 9:
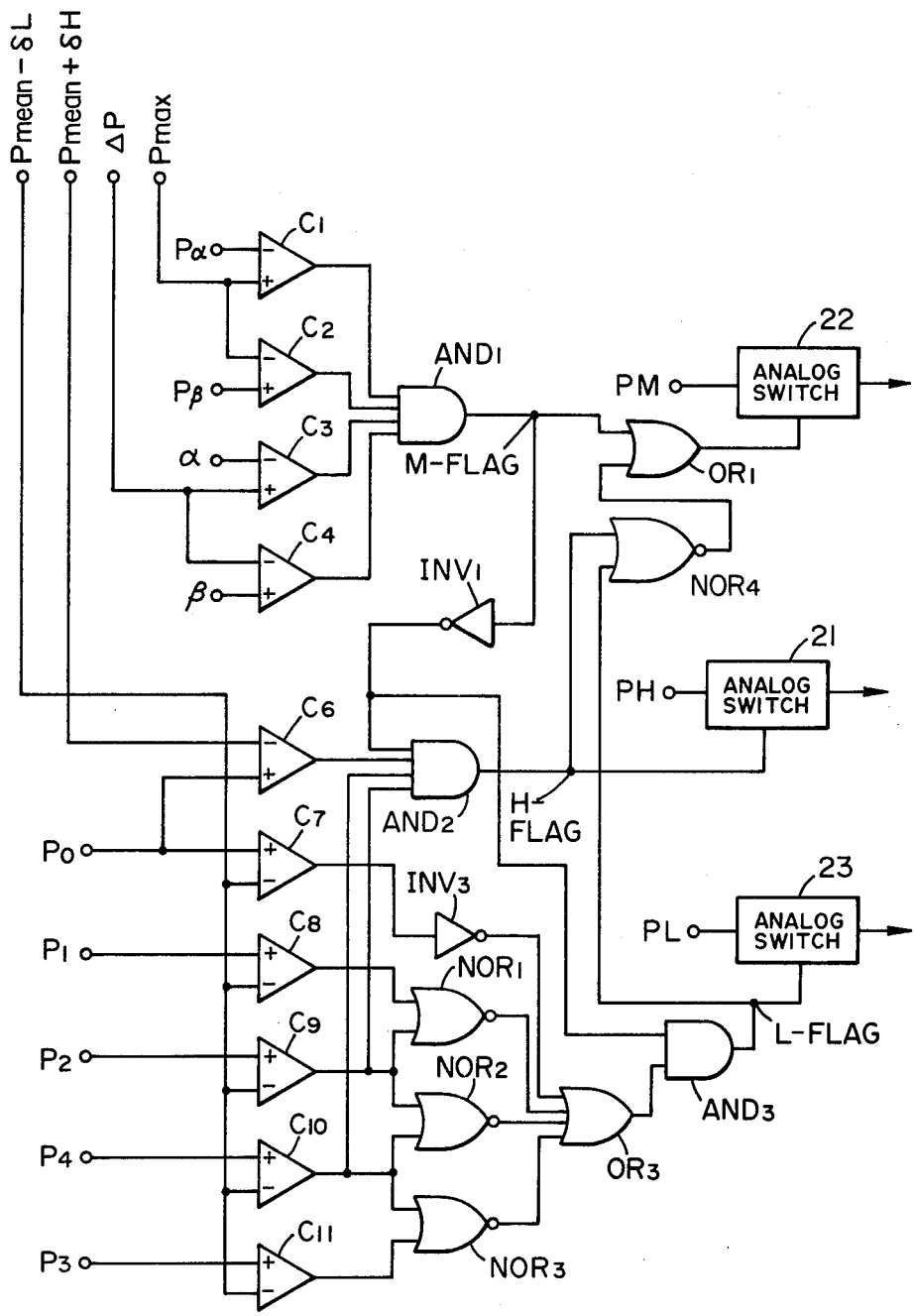
FIG. 9 shows examples of the binary circuit and classifying circuit.

FIG. 9 shows examples of the binary circuit 17 and the classifying circuit 20. This Figure is an embodiment in a case where the picture plane is divided into five as shown in FIG. 3B.

An input corresponding to the constant $P\alpha$ is applied to the inverting input terminal of a comparator $C_1$, and an input corresponding to the constant $P\beta$ is applied to the in-phase input terminal of a comparator $C_2$. On the other hand, an input corresponding to the constant $\alpha$ is applied to the inverting input terminal of a comparator $C_3$, and an input corresponding to the constant $\beta$ is applied to the in-phase input terminal of a comparator $C_4$. A standard input corresponding to $P_{mean} - \delta L$ is applied to the inverting input terminals of comparators $C_7$ through $C_{11}$ which receive the photoelectric outputs $P_0$ through $P_4$ as in-phase inputs. This level-down corresponding to $\delta L$ is for more positively effect the transformation of the photoelectric outputs $P_0$ through $P_4$ into binary form with respect to the low brightness side. A standard input corresponding to $P_{means} + \delta H$ is applied to the inverting input terminal of a comparator $C_6$ which receives the photoelectric output $P_0$ as in-phase input. This level-up corresponding to $\delta H$ is for more positively effecting the transformation of the photoelectric output $P_0$ into binary form with respect to the high brightness side.

The maximum value $P_{max}$ is applied to the in-phase input terminal of the comparator $C_1$ and the inverting input terminal of the comparator $C_2$. The brightness difference $\Delta P$ is applied to the in-phase input terminal of the comparator $C_3$ and the inverting input terminal of the comparator $C_4$. The outputs of the comparators $C_1$ through $C_4$ are applied to an AND gate AND1. The time when the output of the AND gate AND1 becomes 1 is the time when the outputs of the comparators $C_1$ through $C_4$ are all 1, and the time when $$P\alpha \leq P_{max} \leq P\beta \qquad (7)(a)$$

and $$\alpha \leq \Delta P \leq \beta \qquad (7)(b)$$

are established. The output of the AND gate AND1 is M-flag. When the M-flag is 1, the output of an OR gate OR1 becomes 1 and closes the analog switch 22, so that the second metering output PM is selected. This because the establishment of formula (7) (b) indicates that there is a certain degree of brighness difference and when formula (7) (a) is established, namely, when the maximum value is within a certain range, no counter-light condition is present and a proper exposure level exists in the vicinity of the mean value.

The photoelectric output $P_0$ is applied to the in-phase input terminals of the comparators $C_6$ and $C_7$, and the photoelectric outputs $P_1$, $P_2$, $P_3$ and $P_4$ are applied to the in-phase input terminals of the comparators $C_8$, $C_9$, $C_{10}$ and $C_{11}$. The output $P_{mean}+\delta H$ which is an output obtained by increasing the level of the mean value by a predetermined value is applied to the inverting input terminal of the comparator $C_6$. The time when the output of the comparator $C_6$ becomes 1 is the case where the photoelectric output $P_0$ of the central area Dc is appreciably higher (by $\delta H$) than the mean value $P_{mean}$, and it indicates that the central portion of the phototaking picture plane has become a light portion. On the other hand, the output $P_{mean}-\delta L$ which is an output obtained by decreasing the level of the mean value by a predetermined value is applied to the inverting input terminals of the comparators $C_7$ through $C_{11}$. The time when the outputs of the comparators $C_7$ through $C_{11}$ become 0 is the case where the photoelectric outputs $P_0$ through $P_4$ are appreciably lower (by $\delta L$) than the mean value $P_{mean}$ and it indicates that the picture plane to which the photoelectric outputs $P_0$ through $P_4$ correspond has become a dark portion. As is apparent from the comparators $C_6$ and $C_7$, $P_0$ is standardized by being transformed into binary form with respect to the two standard levels in the vicinity of the mean value.

The outputs of the comparators $C_6$, $C_9$ and $C_{10}$ and an output inverted by an M-flag inverter INV1 are applied to an AND gate AND2. The time when the output of the AND gate AND2 becomes 1 is the time when $$P_0 > P_{mean} + \delta H \quad \text{(central area Dc is a light portion)} \quad (8)$$
$$P_2 \geq P_{mean} - \delta L \quad \left.\begin{array}{l}\text{(lower half areas } Drl, \\ Dll \text{ are not dark} \\ \text{portions)}\end{array}\right\}$$
$$P_4 \geq P_{mean} - \delta L$$

are established and M-flag is 0. Such a state is a spotlight-like condition in which the central area Dc is light while the upper half areas Dru and Dlu are dark. Therefore, formulas (8) provide the condition for judging that the major object lies in a light portion. The output of the AND gate AND2 is H-flag. Now, when the H-flag is 1, namely, when the comparators $C_6$, $C_9$ and $C_{10}$ are putting out 1 and the inverter INV1 is putting out 1, the analog switch 21 is closed and the first metering output PH is extracted.

The output of the AND gate AND2 is H-flag. When the H-flag is 1, the analog switch 21 is closed and the first metering output PH is selected. The output of $C_7$ enters an inverter INV3. Now, when $$P_0 < P_{mean} - \delta L \quad \text{(central area Dc is a dark portion)} \quad (9)$$

is eatablished, the output of the comparator $C_7$ is 0 and the output of the inverter INV3 becomes 1.

The outputs of the comparators $C_8$ and $C_9$ enter a NOR gate NOR1.
When $$P_1 < P_{mean} - \delta L \quad \left.\begin{array}{l}\text{(left half areas} \\ Dlu \text{ and } Dll \\ \text{are dark)}\end{array}\right\} \quad (10)$$
$$P_2 < P_{mean} - \delta L$$

are established, the outputs of the comparators $C_8$ and $C_9$ are both 0 and the output of the NOR gate NOR1 becomes 1. Likewise, when $$P_2 < P_{mean} - \delta L \quad \left.\begin{array}{l}\text{(lower half areas} \\ Dr \text{ and } Dll \text{ are} \\ \text{dark)}\end{array}\right\} \quad (11)$$
$$P_4 < P_{mean} - \delta L$$

and $$P_3 < P_{mean} - \delta L \quad \left.\begin{array}{l}\text{(right half area} \\ Dru \text{ and } Drl \text{ are} \\ \text{dark)}\end{array}\right\} \quad (12)$$
$$P_4 < P_{mean} - \delta L$$

are established, the outputs of NOR gates NOR2 and NOR3 both become 1. The outputs of the inverter INV3 and NOR gates NOR1 through NOR3 are applied to an OR gate OR3 and, if the output of any one of these is 1, the output of the OR gate OR3 becomes 1. That is, if any one of formulas (9) through (12) is established, the output of the OR gate OR3 becomes 1. When formula (9) is established, the central portion of the picture plane whereat the major object highly probably lies is dark and in such case, it is better to adjust the exposure to the low brightness side.

Conversely, however, even if the central portion of the picture plane is light, it is often attributable to the brightness of the background and in these cases, it cannot always be judged that the major object lies in the light portion. Rather, in a case such as counter-light, the brightness of the major object becomes approximate to the brightness of the lower portion of the picture plane. Consequently, when formulas (11) are established, it is advisable to judge that the major object lies in the dark portion and to select the third metering output PL. The case where formulas (10) and (12) are established is considered to be the case where photography is effected with the camera positioned lengthwisely. As described above, each of formulas (9) through (12) provides the condition for judging that the major object lies in the dark portion. At such time, the output of the OR gate OR3 becomes 1. If the M-flag of the AND gate AND1 is 0 at this time, namely, if formulas 7(a) and (b) are not satisfied, the inverter INV1 puts out 1. Therefore, the AND gate AND3 puts out 1 and closes the analog switch 23 to extract the third metering output PL.

H-flag and L-flag are applied to a NOR gate NOR4 and when both of them are 0, the NOR gate NOR4 puts out 1. It is a case where no discrimination has been done as to whether the major object lies in the light portion or in the dark portion. At such time, the output of the OR gate OR1 becomes 1 and closes the analog switch 22 to select the second metering output PM.

Figure 10:
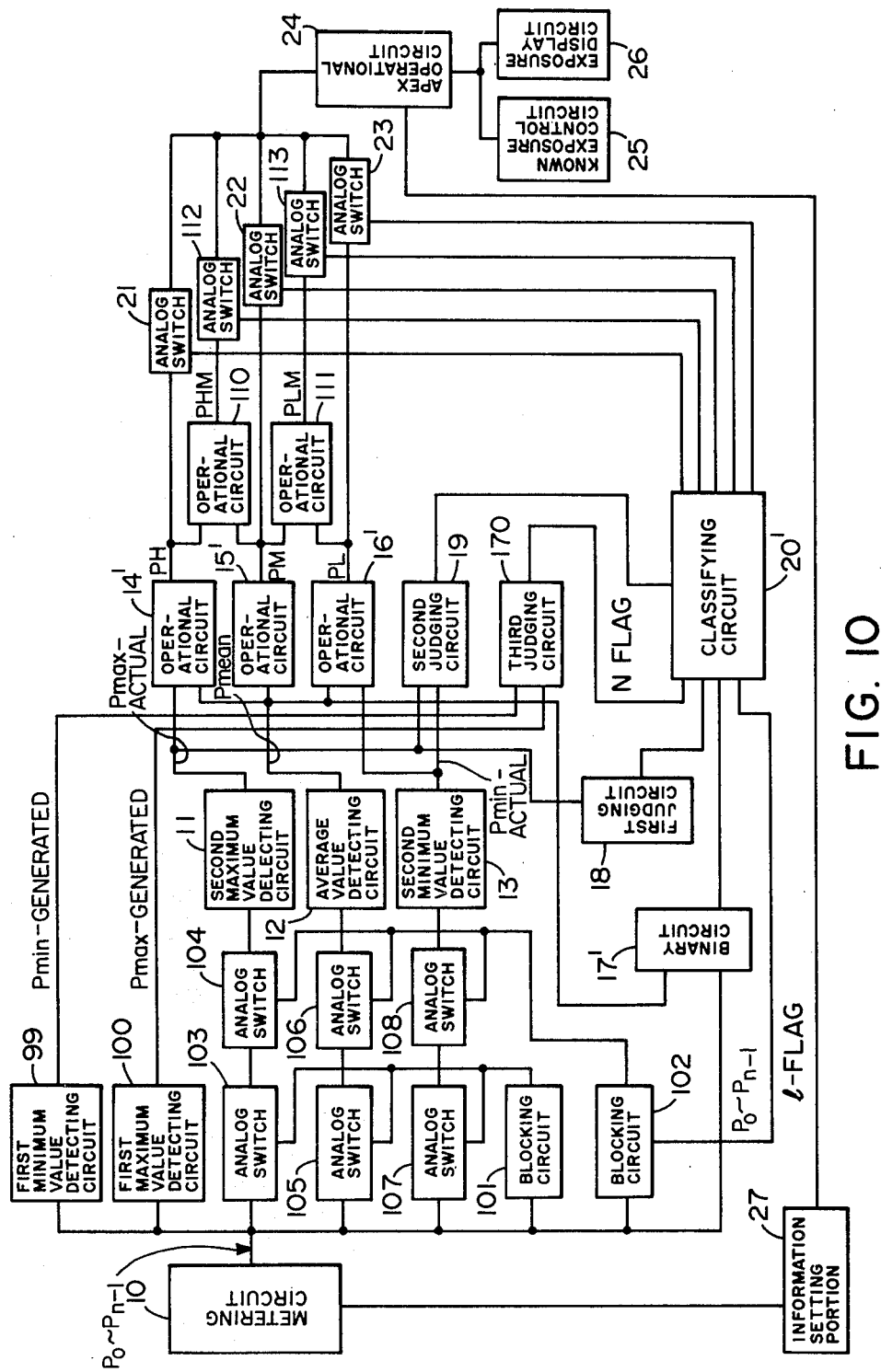
FIG. 10 is a block diagram showing another emboidment of the present invention.

FIG. 10 is a block diagram showing another embodiment of the present invention. In FIG. 10, a metering circuit 10 includes photoelectric converting elements for metering a plurality of areas into which the object field is divided, and puts out independent analog photoelectric outputs $P_0$ through $P_{n-1}$ corresponding to the areas of the object field. It is to be understood that these photoelectric outputs $P_0$ through $P_{n-1}$ have been logarithmically compressed with film speed (SV), and accordingly, the photoelectric outputs are expressed in BV value.

A first maximum value detecting circuit 100 detects the maximum value $P_{max\text{-}generated}$ from among the photoelectric outputs $P_0$ through $P_{n-1}$. A first minimum value detecting circuit 99 detects the minimum value $P_{min\text{-}generated}$ from among the photoelectric outputs $P_0$ through $P_{n-1}$. As will later be described in connection with blocking circuits 101 and 102, a second maximum value detecting circuit 11 receives, through analog switches 103 and 104, those of the photoelectric outputs $P_0$ through $P_{n-1}$ which do not exceed the threshold level, and detects the maximum value $P_{max\text{-}actual}$ from among them. An average value detecting circuit 12 receives, through analog switches 105 and 106, those of the photoelectric outputs $P_0$ through $P_{n-1}$ which are between a plurality of threshold levels, and detects the average value of them, for example, the mean value $P_{mean}$. A second minimum value detecting circuit 13 receives, through analog switches 107 and 108, those of the photoelectric outputs $P_0$ through $P_{n-1}$ which exceed the threshold level, and detects the minimum value $P_{min\text{-}actual}$ from among them. An operational circuit 14' receives the maximum value $P_{max\text{-}actual}$ and the mean value $P_{mean}$ as input and generates a first metering output PH (see equation (1)). An operational circuit 15' generates a second metering output PM (see equation (2)), but actually it may be used in common with the average value detecting circuit 12. An operational circuit 16' receives the minimum value $P_{min\text{-}actual}$ and the mean value $P_{mean}$ as input and generates a third metering output PL (see equation (3)). The above-described circuits 11, 12, 13, 14', 15', 16' together constitute a proper metering output generating circuit.

An operational circuit 110 receives the metering outputs PH and PM applied from the circuits 14' and 15', and puts out a fourth metering output, namely, PHM = (PH+PM)/2. An operational circuit 111 receives the metering outputs PM and PL applied from the circuits 15' and 16', and puts out a fifth metering output, namely, PLM = (PM+PL)/2.

A binary circuit 17' is a portion for effecting the standardization, receives the photoelectric outputs $P_0$ through $P_{n-1}$ and the mean value $P_{mean}$ as input, compares the metering outputs $P_0$ through $P_{n-1}$ with a standard output generated on the basis of the mean value $P_{mean}$, and converts each of the photoelectric outputs into a logic output. Specifically, in the embodiment, it compares the output Pi of the ith position with the mean value $P_{mean}$ and converts it into 1 when $Pi \geq P_{mean}$ and converts it into 0 when $Pi < P_{mean}$. If the standardized output is 1, it indicates that the ith position is a portion lighter than the average, and if the standardized output is 0, it indicates that the ith position is a portion darker than the average. That is, the aforementioned standardization assumes the binary form.

Design may also be made as follows. To divide the entire brightness into a light portion, a dark portion and an intermediate portion, a method is adopted which comprises setting $P_{mean}+\delta H$ and $P_{mean}-\delta L$ as the standard outputs based on the mean value $P_{mean}$ and effecting transformation into binary form for these two standard levels. That is, it is rendered into 1 when $Pi > P_{mean}+\delta H$ is established, it is rendered into 0 when $Pi \leq P_{mean}+\delta H$ is established. It is rendered into 1 when $Pi \geq P_{mean}-\delta L$ is established, and it is rendered into 0 when $Pi < P_{mean}-\delta L$ is established. In this case, the binary output of the ith position becomes 2 bits.

When $P_{mean}+\delta H$ and $P_{mean}-\delta L$ are arranged in the order of comparison, if the output is 11, it indicates a light portion, if the output is 00, it indicates a dark portion, and if the output is 01, it indicates an intermediate portion approximate to the mean value (the case of 10 does not exist). By dividing the brightness of that position into three stages, a higher degree of pattern analysis becomes possible.

Of course, it is also possible to divide the binary circuit into four or more stages and the manner of division may be varied in accordance with the position.

Next, a first judging circuit 18 receives the maximum value $P_{max\text{-}actual}$ as input and effects the judgment of $$P\alpha \leq P_{max\text{-}actual} \leq P\beta (P\alpha \text{ and } P\beta \text{ are constants})$$

and generates a logic output representing the judgment result. Of course, the first judging circuit 18 includes a circuit for generating standard outputs corresponding to $P\alpha$ and $P\beta$. This judging operation is effected to discriminate whether the maximum value $P_{max\text{-}actual}$ is attributable to a bright light source including the sun or to an artificial light source such as a spot light. A second judging circuit 19 receives the maximum value $P_{max\text{-}actual}$ and the minimum value $P_{min\text{-}actual}$ as input and effects the operation of $$\Delta P = P_{max\text{-}actual} - P_{min\text{-}actual}$$

and then effects the judgment of $$\alpha \leq \Delta P \leq \beta (\alpha \text{ and } \beta \text{ are constants})$$

and generates a logic output representing the judgment result. Of course, a circuit for generating standard outputs corresponding to the constants $\alpha$ and $\beta$ is included in the second judging circuit 19. This judging operation is effected to judge the brightness distribution of the picture plane and to present a phenomenon that, for example, when the brightness distribution is great the high brightness side jumps if the exposure is adjusted to the low brightness side by the reason that the major object lies on the low brightness side and conversely, the low brightness side collapses if the exposure is adjusted to the high brightness side by the reason that the major object lies on the high brightness side.

A classifying circuit 20' receives as input the logic outputs from the circuits 17', 18, 19, the N-flag from a third judging circuit 170 to be described and the l-flag from a second blocking circuit 102 to be described, and determines or classifies to which of predetermined categories the combination logic of these logic outputs belongs. There are five such predetermined categories and a control output corresponding to each of these categories is selectively generated. Analog switches 21, 22, 23, 112 and 113 connected between circuits 14', 15', 16', 110, 111 and an apex operational circuit 24, respectively, select outputs corresponding to the categories classified from among the first to fifth metering outputs by the control output of the classifying circuit 20', and transmits the same to the apex operational circuit 24.

The apex operational circuit 24 generates an output corresponding to a proper exposure value (shutter speed and aperture value) by the selected metering output and other exposure factor from an information setting portion 27, and applies the same to a known exposure control circuit 25 and an exposure display circuit 26.

A first minimum value detecting circuit 99 and a first maximum value detecting circuit 100 receive the photoelectric outputs $P_0$ through $P_{n-1}$ as input and respectively detect the minimum value $P_{min \cdot generated}$ and the maximum value $P_{max \cdot generated}$ from among these photoelectric outputs. A third judging circuit 170 receives as input the maximum value $P_{max \cdot generated}$ and the minimum value $P_{min \cdot generated}$ from the first minimum value detecting circuit 99, and effects the judgment of $$P_{max \cdot generated} - P_{min \cdot generated} \leq \gamma (\gamma \text{ is constant}).$$

Of course, this judging circuit 170 includes a circuit for generating a standard output corresponding to the constant $\gamma$, and a comparing circuit. This judging operation is for judging whether or not the fourth or the fifth metering output is to be extracted. The output of this circuit is applied as N-flag to the classifying circuit 20'.

A first blocking circuit 101 receives the photoelectric outputs $P_0$ through $P_{n-1}$ as input and compares these with two threshold levels. A first threshold level $Pth_1$ is set to a level equivalent to about EV16 (when ASA is 100) by supposing that the daytime sun exists in the picture plane, and a second threshold level $Pth_2$ is set to a level equivalent to about EV15 (when ASA is 100) by supposing that the evening sun exists in the picture plane. When there is a photoelectric output exceeding the threshold level $Pth_1$, the first blocking circuit 101 first controls the analog switch 103 to block the transmission of that photoelectric output to the circuit 11, 12 and 13. However, when all the photoelectric outputs exceed the threshold level $Pth_1$, the first blocking circuit 101 controls the analog switch 103 so that any one of the photoelectric outputs can be transmitted to the next stage circuit. The reason will be described later. Next, when there is a photoelectric output exceeding the threshold level $Pth_2$, the first blocking circuit 101 controls the analog switch 103 to block the transmission of that photoelectric output to the circuits 11, 12 and 13, but the number of blockings thereof is limited to a predetermined number or less. This is because, in the case of evening photography, the sun itself sometimes becomes the object of the photography and if all the information thereon is blocked, the photographer's intention may not be reflected.

A second blocking circuit 102 receives the photoelectric outputs $p_0$ through $P_{n-1}$ as input and compares these with a threshold level $Pth_0$ corresponding to the lower limit of metering. When there is a photoelectric output lower than $Pth_0$, the second blocking circuit 102 controls the analog switch 104 to block the transmission of that photoelectric output to the circuits 11, 12 and 13. Then, the second blocking circuit 102 generates l-flag representing whether the number of blockings is above or below a predetermined value, and applies the same to the calssifying circuit 20'.

By the first and second blocking circuits 101 and 102, the number of blockings of the transmission to the next stage circuit is transmitted to the average value detecting circuit 12 and during the calculation of the mean value. these cells are excepted from the object of the calculation.

Next, the operation and the classification mode of the classifying circuit 20' will be described with respect to the cases where the picture plane is divided into three and five, respectively.

The photoelectric outputs $P_0$ through $P_2$ are compared with the mean value $P_{mean}(=P_0+P_1+P_2)/3$, and each area is represented by the logic value 1 when $P_0$ through $P_2 \geq P_{mean}$ and represented by the logic value 0 when $P_0$ through $P_2 < P_{mean}$. The classifying circuit 20' closes the analog switch 23 to transmit the third metering output PL to the apex operational circuit 24 when the combination of the logic values is such that (i) the central area Dc is 0 or the lower area Dl is 0 (because, at this time, there is a high probability that the major object exists in the area Dc or Dl); closes the analog switch 21 to transmit the first metering output PH to the apex operational circuit 24 when the combination of the logic values is such that (ii) the central area Dc is 1 (because, at this time, there is a high probability that the major object exists in the area Dc); and closes the analog switch 113 to extract the fifth metering output (PM+PL)/2 instead of the third metering output PL (iii) if the picture plane is in the state of (i) when N-flag is 1, namely, when $P_{max \cdot generated} - P_{min \cdot generated} \leq \gamma$, and closes the analog switch 112 to extract the fourth metering output (PM+PH)/2 instead of the first metering output PH if the picture plane is in the state of (ii).

This is because, in a condition in which the first or the third metering output is extracted, when the difference between the maximum value $P_{max \cdot generated}$ and the minimum value $P_{min \cdot generated}$ of the photoelectric output is small, namely, when the object is of relatively uniform brightness, collection toward the mean value may often result in a preferable photograph.

On the other hand, the first judging circuit 18 generates an output of logic value 1 when $P\alpha \leq P_{max \cdot actual} \leq P\beta$, and generates an output of logic value 0 during the other time. The second judging circuit 19 generates an output of logic value 1 when $\alpha \leq \Delta P \leq \beta$, and generates an output of logic value 0 during the other time. When the logic value 1 has been applied from the first and second judging circuits 18 and 19, even if the picture plane is in the state of (i) or (ii), the classifying circuit 20' closes the analog switch 22 to transmit the second metering output PM to the apex operational circuit 24.

(4) In FIG. 3B, the photoelectric outputs $P_0$ through $P_4$ are compared with the mean value $P_{mean}$ in the same manner as described above and each area is represented by the logic value 1 or 0. The classifying ciroiut 20' closes the analog switch 23 to transmit the third metering output PL to the apex operational circuit 24 when the combination of the logic values is such that (i) the central area Dc is 0, the left and right lower areas Dll and Drl are 0, the left upper area Dlu and the left lower area Dll are 0, and the right upper area Dru and the right lower area Drl are 0 (because, at this time, there is a high probability that the major object exists in the area of 0). The operations in the states of (ii), (iii) and (iv) are the same as the operation described under item (1). This example of the division into five takes it into consideration that there are lengthwise and breadthwise photographing positions as in the case of a Leika format camera.

Now, in the aforementioned items (3) and (4), when a high brightness portion exceeding the threshold level $Pth_1$ lies in a certain area within the picture plane, the photoelectric output of that area, for example, $P_1$, is blocked and the mean value becomes $P_{mean}' = (P_0+P_2)/2$ or $P_{mean}' = (P_0+P_2+P_3+P_4)/4$. Accordingly, the circuit 17' and the operational circuits 14', 15' and 16' use such mean value to operate. That is, the circuit 17' converts each photoelectric output into a logic output on o the basis of this new mean value $P_{mean}'$, and the operational circuits 14', 15' and 16' generate modified metering outputs PH, PM and PL on the basis of this mean value $P_{mean}'$. These modified metering outputs are selectively extracted by the classifying circuit 20' in the same manner as described above.

Now, when the entire picture plane is of the same high brightness, for example, when clouds are to be photographed, only the maximum value $P_{max\text{-}actual}$ of the photoelectric outputs is applied to the circuits 11, 12 and 13. Thereupon, the maximum, the mean value and the minimum value all become coincident with $P_{max\text{-}actual}$. At this time, the picture plane assumes the state of the (iii) in the aforementioned items (1) and (2) and the second metering output PM is selected, but since PM = $P_{max\text{-}actual}$, exposure control is effected for the high brightness.

Next, the transmission of the photoelectric outputs exceeding the threshold level $Pth_0$ to the circuits 11, 12 and 13 is blocked within a predetermined number, and the mean value $P_{mean}$ is also reduced to a predetermined mean value $P_{mean}''$ in accordance with this number of blockings. Then, on the basis of this mean value $P_{mean}''$, the operation takes place in the same manner as the previous stage.

The correction during the generation of the metering output for the presence of the high brightness portion is effected in the manner described above.

On the other hand, where there is a photoelectric output lower than the threshold level $Pth_0$, the transmission of this photoelectric output, for example, $P_1$, to the circuits 11, 12 and 13 is blocked, so that the absolute level of the mean value is increased to $P_{mean}''' = (P_0+P_2)/2$ or $P_{mean}''' = (P_0+P_2+P_3+P_4)/4$. Therefore, there are obtained new first to fifth metering outputs PH, PHM, PM, PL, PLM in which the photoelectric outputs lower than the lower limit of metering are neglected. These metering outputs are selected by the classifying circuit 20 in the same manner as described above. In this manner, the correction when a low brightness portion exists in the picture plane is effected.

The construction of each block will hereinafter be described. The arrangement of the photoelectric elements, the light-receiving optical system, the maximum value detecting circuit 11, the minimum value detecting circuit 13 and the mean value detecting circuit 12 are the same as those shown in FIGS. 4 through 7 and therefore need not be described.

Figure 11:
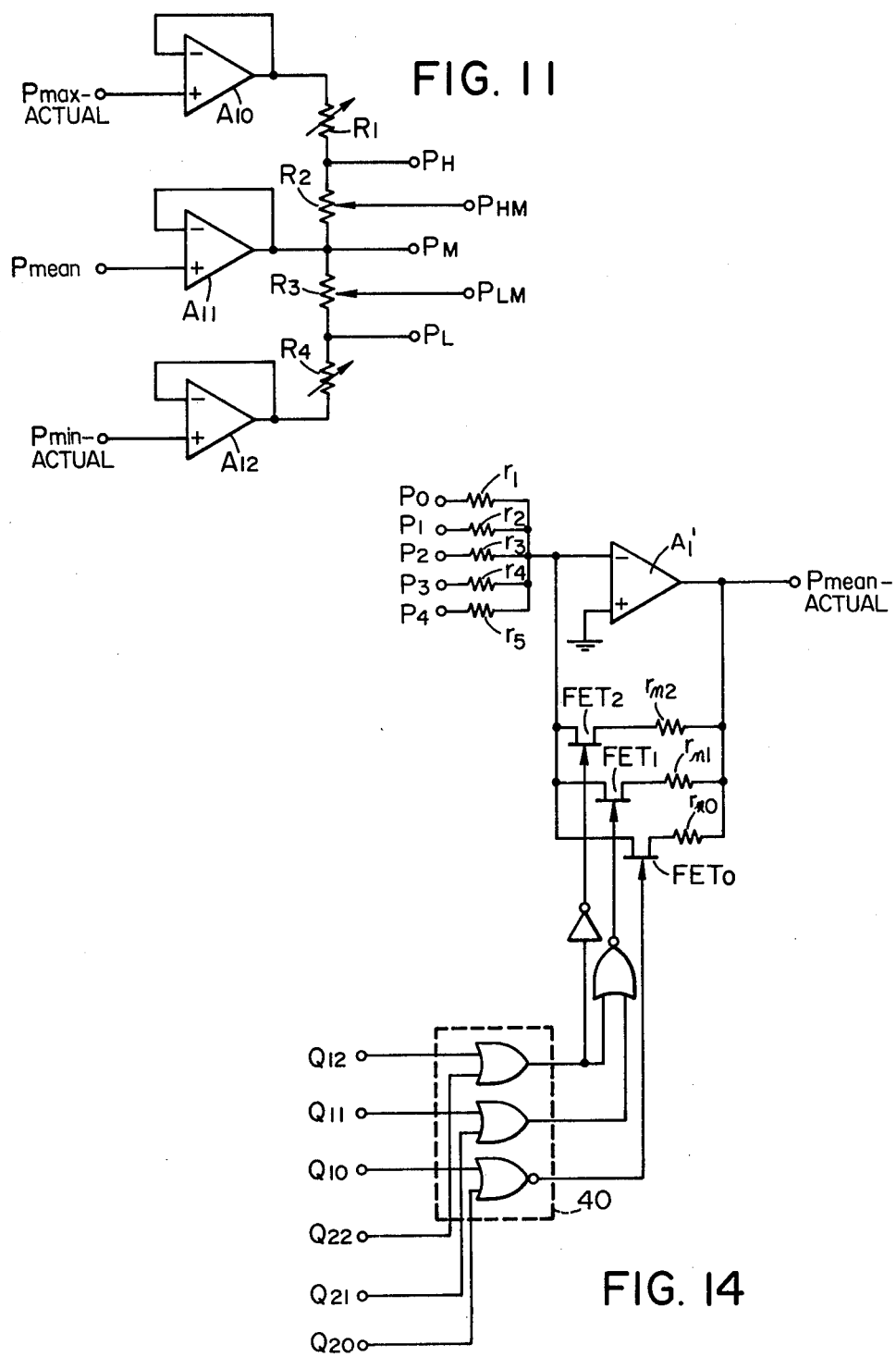
FIG. 11 shows examples of the operational circuits.

FIG. 11 shows examples of the operational circuits 14', 15' and 16', which comprise followers $A_{10}$ through $A_{12}$ and voltage dividing resistors $R_1$ through $R_4$, and the first to fifth metering outputs PH, PM, PL, PHM and PLM can be obtained by adjusting the voltage dividing ratio to satisfy equations (1), (2) and (3).

Figure 12:
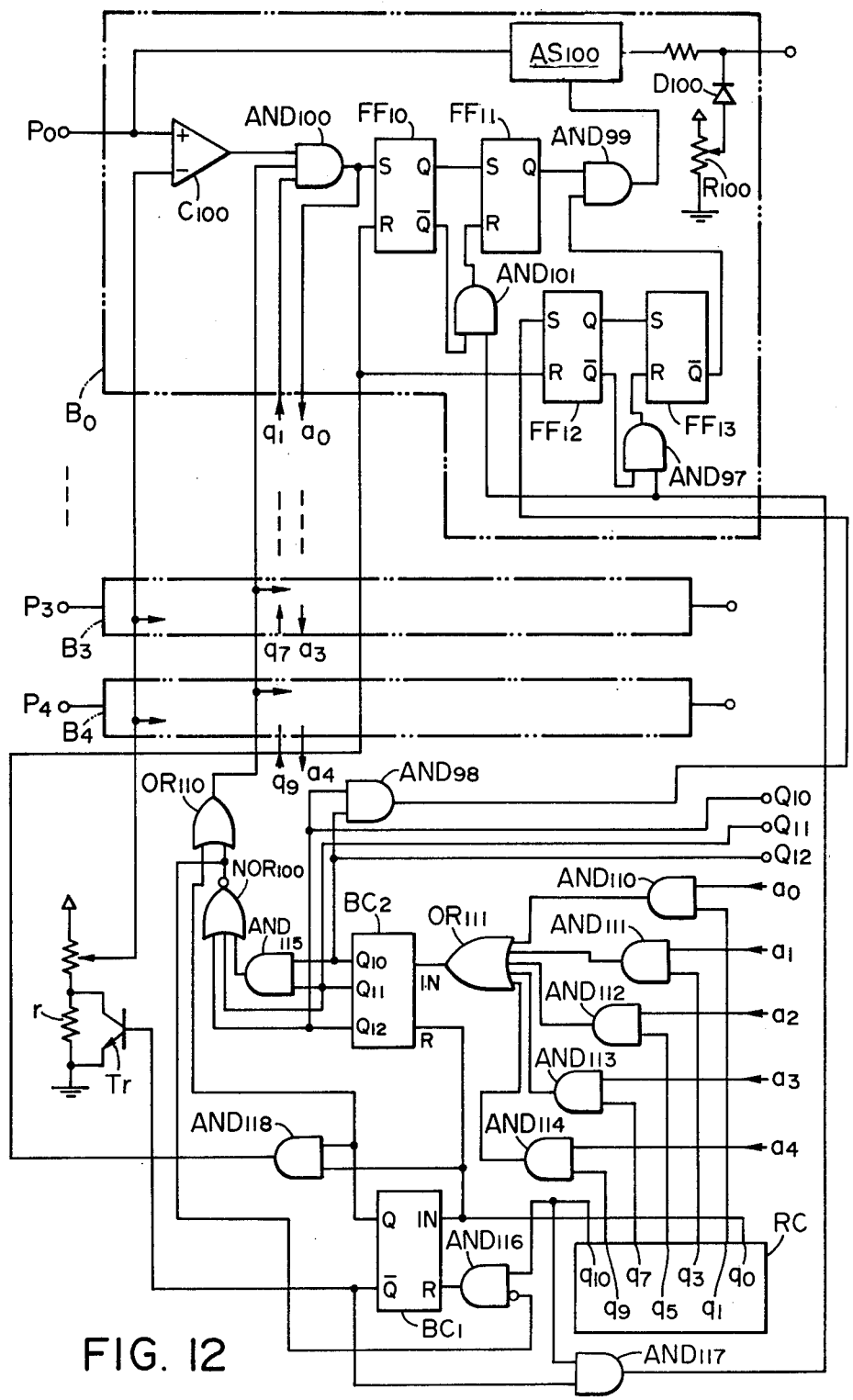
FIG. 12 shows an example of a first blocking circuit.

FIG. 12 shows an example of the first blocking circuit in which the number of blockings is 2.

In FIG. 12, circuit blocks each comprising a comparator C100, AND gates AND 100 and AND 101, flip-flops FF10 and FF11, and an analog switch AS100 are prepared so as to correspond to the number of photoelectric outputs. Herein, five blocks are prepared correspondingly to the photoelectric outputs $P_0$ through $P_4$, and are typically represented by block Bo. However, AND gates AND 99 and AND 100 and flip-flops FF12 and FF13 are for the exclusive use of the block Bo.

Now, a ring counter RC has applied thereto clock pulses of a predetermined period and generates outputs at its output terminals $q_0$, $q_1$, $q_3$, $q_5$, $q_7$, $q_9$ and $q_{10}$ in accordance with the clock pulse number. The terminals $q_1$ through $q_9$ are provided at every other bit and a time lag corresponding to 1 bit is provided between the outputs. A binary counter BC1 receives the $q_0$ output of the ring counter RC as input and the AND of the Q output and the $q_0$ output is taken at AND 118 and pulses of every two period of the $q_0$ output are generated. When the Q output is 1, the $\overline{Q}$ output puts out 0 to turn off a transistor $T_r$ and apply to the inverting input terminal of the comparator of each block a voltage corresponding to the above-described threshold level $Pth_1$. When the Q output is 0, the $\overline{Q}$ output becomes 1 to turn on the transistor $T_r$ and a voltage corresponding to the above-described threshold level $Pth_2$ is applied to the inverting input terminal of the comparator of each block. These comparators put out 1 when $Pi > Pth$ (Pi is each photoelectric output and Pth is $Pth_1$ or $Pth_2$) Operation will now be described.

(a) When the Q output of the binary counter BC1 is 1: In this time, the mode is one for detecting $Pi > Pth_1$. Since the output of an OR gate OR110 is 1, the AND gate AND100 of the block Bo applies the output of the comparator C100 to the S input of flip-flop FF10 when it has received the $q_1$ output of the ring counter RC. If $P_0 > Pth_1$, the comparator C100 puts out 1 and therefore, the flip-flop FF10 puts out 1 at its Q output. At the same time, flip-flop FF11 puts out 1 at its Q output to open an analog switch AS100 so as not to transmit $P_0$ to the next stage circuit. This operation is time-divided by the $q_1$ through $q_9$ outputs of the ring counter RC and successively shifts toward the block which receives the photoelectric output $P_4$ as input. As the result, from the block which receives the photoelectric output of $Pi > Pth_1$ as input, the photoelectric output is not transmitted to the next stage circuits, namely, the aforementioned second maximum value detecting circuit 11, the average value detecting circuit 12 and the second minimum value detecting circuit 13. On the other hand, the $a_0$ output of the AND gate AND100 is applied to an AND gate AND110 which receives the $q_1$ output of the ring counter RC as input and, when the $a_0$ output and the $q_1$ output are both 1, the AND gate AND 110 puts out 1, which is applied to a binary counter BC2 through an OR gate OR111. Likewise, the $a_1$, $a_2$, $a_3$ and $a_4$ outputs of the AND gate AND 111 through AND114 of each block are applied to the binary counter BC2 in synchronism with the $q_3$, $q_5$, $q_7$ and $q_9$ outputs, respectively. Accordingly, the binary counter BC2 counts 1 of the $a_0$ through $a_4$ outputs.

However, since the Q output of the binary counter BC1 is 1, the output of the OR gate OR110 is 1 independently of the count of the counter BC2. Accordingly, when $P_0$ through $P_4 > Pth_1$, the transmission of all photoelectric outputs to the next stage circuit is blocked, but when the count of the binary counter BC2 is 5, namely, "101" in binary code, the $Q_{10}$ output and $Q_{12}$ output of the binary counter BC2 both become 1 and an AND gate AND98 puts out 1, and 1 enters the set input of flip-flop FF12 and the output Q becomes 1, and 1 enters the set input of flip-flop FF13 and the output Q becomes 1 while the output $\overline{Q}$ becomes 0. (The reset timing relation is similar to that of FF10 and FF11.) Therefore, the output of the AND gate AND99 becomes 0 to close the analog switch AS100. As the result, the photoelectric output $P_0$ is transmitted to the next stage circuit. Here, if the anode terminal of a diode D100 is increased from a voltage corresponding to $Pth_2$ by an amount of reduction by the diode, the photoelectric output $P_0$ is limited to the voltage corresponding to $Pth_2$. This is based on the consideration that when the entire picture plane is of high brightness, over-exposure may rather result in obtainment of a more realistic photograph. When the count of the binary counter BC2 is less than 1, the output of a NOR gate NOR100 is 1 and the AND gate AND99 transmits the Q output of the flip-flop FF11 intactly to the analog switch AS100.

When the count of the binary counter BC2 becomes greater than 2, the $Q_{11}$ output, the $Q_{12}$ output or the output of an AND gate AND115 becomes 1 and at this time, the NOR gate NOR100 puts out 0. Thereupon, an AND gate AND116 resets the binary counter BC1 at a point of time whereat the $q_{10}$ output of the ring counter RC has become 1 and therefore, the Q output becomes 1 at a point of time whereat the $q_1$ output has again become 1 and, as the result, the mode does not shift to the mode for detecting $Pi > Pth_2$.

ⓑ When the Q output of the binary counter BC1 is 0: In this time, the mode is one for detecting $Pi > Pth_2$. When the output of the NOR gate NOR100 is 1, the output of the OR gate OR110 becomes 1. That is, the time when the count of the binary counter BC2 is less than 2 is the time when the $Q_{10}$ output is 1 or the $Q_{11}$ output is 1.

Now, if the count of the counter BC2 is 0, the NOR gate NOR100 and the OR gate OR110 put out 1 and therefore, the comparator of each block compares the photoelectric outputs $P_0$ through $P_4$ with the threshold level $Pth_2$. When there are photoelectric outputs greater than $Pth_2$, for example, when $P_0$, $P_1$, $P_2$ are greater than $Pth_2$, the $a_0$, $a_1$ and $a_2$ outputs become 1. By the application of the $q_1$, $q_3$ and $q_5$ outputs, AND gates AND110 through AND112 put out 1, which is counted by the counter BC2. Accordingly, the $Q_{10}$ and $Q_{11}$ outputs become 1 and therefore, the AND gate AND115 puts out 1 and the NOR gate NOR100 and OR gate OR110 put out 0. When three photoelectric outputs are blocked as the result, no more blocking takes place. That is, the time-sequentially continuedly operating block effects no blocking operation. By the limitation of the blocking operation, there is a possibility that a photoelectric output greater than $Pth_2$ is transmitted to the next stage circuit, but this forms no problem because such photoelectric output is limited to a voltage equivalent to $Pth_2$ by the action of diodes D100 through D104 and resistors R100 through R104.

AND gates AND117 and AND118 generates the reset pulses of flip-flops FF10 and FF11 and, after the AND gate AND117 has generated an output 1, the AND gate AND118 generates an output 1 to thereby adjust the reset timing of the flip-flops FF10 and FF11.

Figure 13:
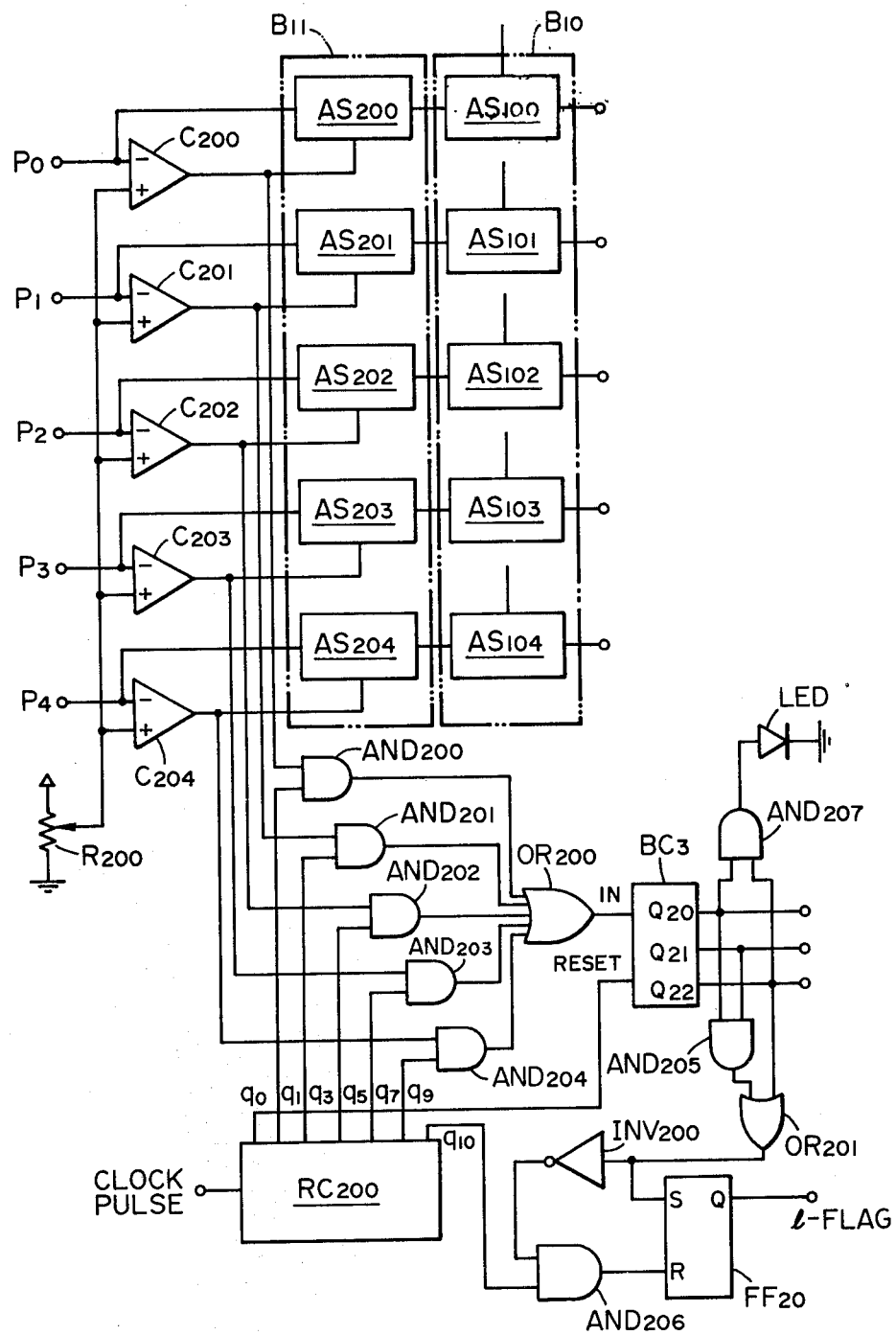
FIG. 13 shows an example of a second blocking circuit.

FIG. 13 shows an example of the second blocking circuit. In FIG. 13, a voltage corresponding to the threshold level $Pth_0$ is generated by a resistor R200 and applied to the in-phase input terminals of comparators C200 through C204. Photoelectric outputs $P_0$ thorugh $P_4$ are applied to the inverting input terminals of the comparators C200 through C204, each of which generates an output 1 when $Pi < Pth_0$ (Pi is arbitrary $P_0$ through $P_4$) is satisfied. Analog switches AS200 through AS204 provided so as to correspond to the comparators block the transmission of the photoelectric outputs to the next stage circuit for the output 1 of the corresponding comparators. The analog switches AS100 through AS104 of the respective blocks described in connection with FIG. 12 (AS101 through AS104 are not shown in FIG. 12) are connected in series with the analog switches AS200 through AS204, respectively. The blocks B10 and B11 of the analog switches respectively correspond to the circuits 103 and the circuit 104 of FIG. 10.

A ring counter RC200 generates $q_0$, $q_1$, $q_3$, $q_5$, $q_9$ and $q_{10}$ outputs in succession upon application of clock pulses. The $q_1$ through $q_9$ outputs are put out with a time lag corresponding to 1 bit of the counter. Now, when the $q_0$ output of the ring counter RC200 becomes 1, a binary counter BC3 is reset. When the $q_1$ output becomes 1, the gate of an AND gate AND200 is opened to transmit the output of the comparator C200 to an OR gate OR200. If, at this time, the output of the comparator C200 is 1 ($P_0 < Pth_0$), the binary counter BC3 counts this output 1. As the $q_1$ through $q_9$ outputs of the ring counter RC200 successively become 1, the same operation shifts to AND gates AND201 through AND204 and, if there are those of the photoelectric outputs $P_1$ through $P_4$ which satisfy $Pi < Pth_0$, the binary counter BC3 advances its count by the number thereof. When the count of the binary counter BC3 becomes 3, the $Q_{20}$ output and the $Q_{21}$ output both become 1 and the output of an AND gate AND205 becomes 1, so that the Q output of flip-flop FF20, namely, l-flag, is caused to become 1 by the output 1 of an OR gate OR201. Likewise, when the count of the binary counter BC3 is 4 or 5, l-flag is also 1.

When the operation progresses and the $q_{10}$ output of the ring counter RC200 becomes 1, the flip-flop FF20 is not reset and the l-flag maintains 1 because when the count of the binary counter BC3 is 3 or greater, the output of an AND gate AND206 to which an output 0 is being applied from an inverter INV200 is 0. If the number of blockings is 2 or less in the next period, the output of the inverter INV200 is 1 and therefore, the l-flag becomes 0.

When the $Q_{20}$ output and the $Q_{22}$ output of the binary counter BC3 are both 1, the number of blockings becomes 5 and the entire picture plane is lower than the lower limit of metering. Accordingly, if this is detected by an AND gate AND207, a light-emitting diode LED will be turned on to display the impossibility of photography.

FIG. 14 shows an example of the average value detecting circuit which comprises resistors $r_1$ through $r_5$ of resistance value r, resistors $r_{mo}$, $r_{m1}$ and $r_{m2}$ of resistance value r, r/2 and r/2, amplifier $A_1'$, and field effect transistors $FET_0$ through $FET_2$. In FIG. 14, the blocking operation of the first blocking circuit (the high brightness side) and the blocking operation of the second blocking circuit (the low brightness side) cannot take place simultaneously in the ordinary photographing condition and therefore, the adding circuit 40 is constituted by OR gates.

Field effect transistors FET conduct when the gates put out 1.

• When the number of blockings is 0, all the gates put out 1 and the field effect transistors FET all conduct, so that the composite feedback resisrance R is r/5, $$\frac{1}{R} = \frac{2}{r} + \frac{2}{r} + \frac{1}{r} = \frac{5}{r}, R = \frac{r}{5}$$

that is, $$\left(\frac{P_0}{r} + \frac{P_1}{r} \cdots + \frac{P_4}{r}\right) \cdot \frac{r}{5} = \frac{P_{all}}{5} = P_{mean}$$

where $P_{all}$ is the sum of the non-blocked photoelectric outputs.

• When the number of blockings is 1, the field effect transistor FET0 becomes nonconductive, so that $$R = \frac{1}{\frac{2}{r} + \frac{2}{r}} = \frac{r}{4}, \frac{P_{all}}{4} = P_{mean}$$

• When the number of blockings is 2, the field effect transistor FET1 becomes non-conductive, so that $$R = \frac{1}{\frac{2}{r} + \frac{1}{r}} = \frac{r}{3}, \frac{P_{all}}{3} = P_{mean}$$

• When the number of blockins is 3, the field effect transistors FET0 and FET1 become non-conductive, so that $$R = \frac{1}{\frac{2}{r}} = \frac{r}{2}, \frac{P_{all}}{2} = P_{mean}$$

• When the number of blockings is 4, the field effect transistors FET1 and FET2 become non-conductive, so that $$R = \frac{1}{\frac{1}{r}} = r, P_{all} = P_{mean}$$

Figure 15:
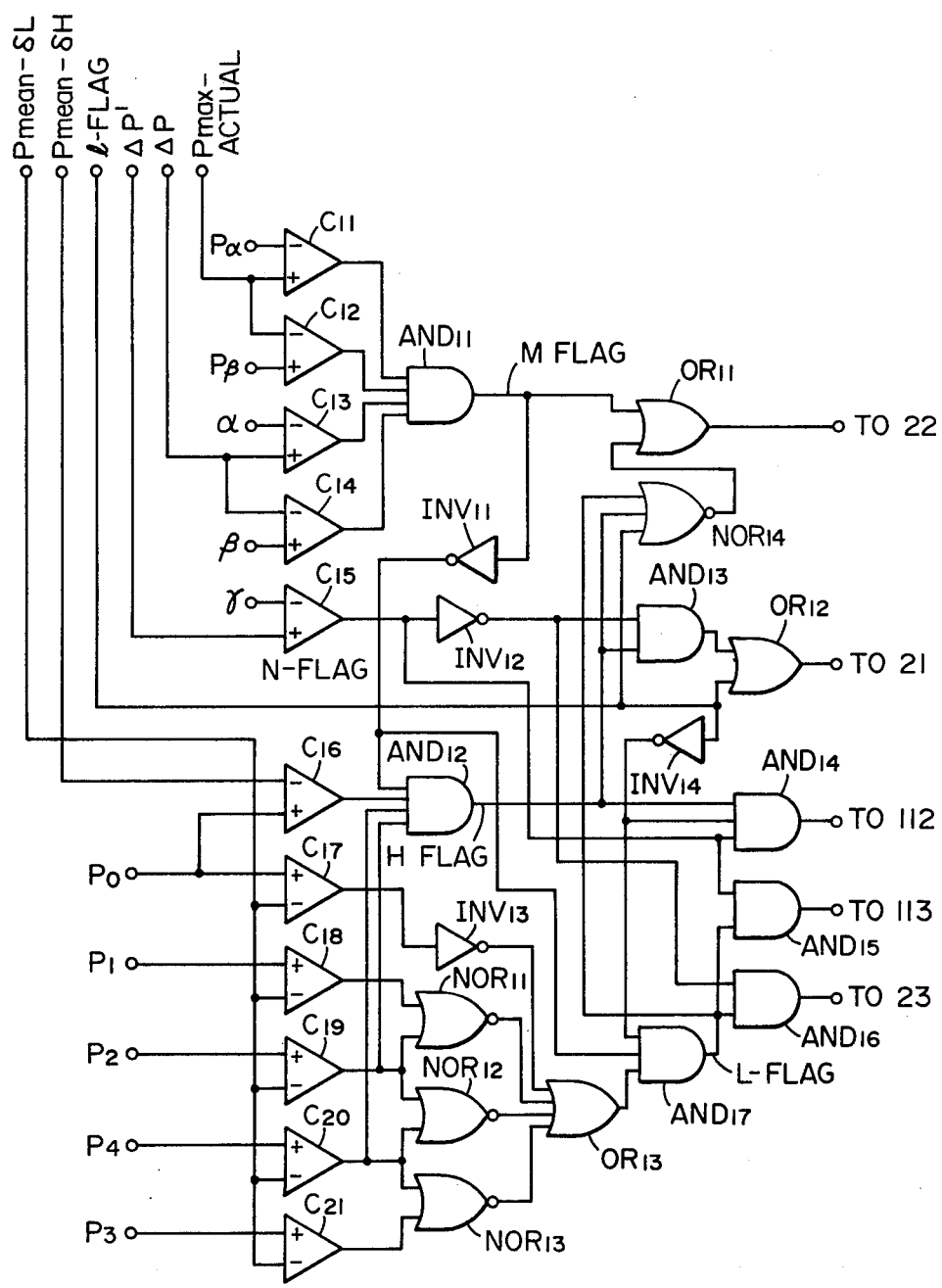
FIG. 15 shows examples of the binary circuit and classifying circuit.

FIG. 15 shows examples of the binary circuit 17' and the classifying circuit 20'. This figure is an embodiment when the picture plane is divided into five as shown in FIG. 3(b).

An input corresponding to the constant $P\alpha$ is applied to the inverting input terminal of a comparator C11 and an input corresponding to the constant $P\beta$ is applied to the in-phase input terminal of a comparator C12. On the other hand, an input corresponding to the constant $\alpha$ is applied to the inverting input terminal of a comparator C13 and an input corresponding to the constant $\beta$ is applied to the in-phase input terminal of a comparator C14. An input corresponding to the constant $\gamma$ is applied to the in-phase input terminal of a comparator C15. A standard input equivalent to $P_{mean} - \delta L$ is applied to the inverting input terminals of comparators C17 through C21 which receive the photoelectric outputs P0 through P4 as synchronous inputs. This level-down equivalent to $\delta L$ is for more positively effecting the transformation of the photoelectric circuits P0 through P4 into binary form with respect to the low brightness side. A standard input equivalent to $P_{mean} + \delta H$ is applied to the inverting input terminal of a comparator C16 which receives the photoelectric output P0 as in-phase input. This level-up equivalent to $\delta H$ is for more positively effecting the transformation of the photoelectric output P0 into binary form with respect to the high brightness side.

The maximum value $P_{max \cdot actual}$ is applied to the in-phase input terminal of the comparator C11 and the inverting input terminal of the comparator C12. The brightness difference $\Delta P$ is applied to the in-phase input terminal of the comparator C13 and the inverting input terminal of the comparator C14. The outputs of the comparators C11 through C14 are applied to an AND gate AND11. The time when the output of the AND gate AND11 becomes 1 is the time when the outputs of the comparators C11 through C14 all indicate 1 and the time when $$P\alpha \leq P_{max \cdot actual} \leq P\beta \tag{7}(a)$$

and $$\alpha \leq \Delta P \leq \beta \tag{7}(b)$$

are established. The output of the AND gate AND11 is M-flag.

When the M-flag is 1, the output of an OR gate OR11 becomes 1 to close an analog switch 22 and select the second metering output PM. This is because the establishment of formula (7)(b) indicates that there is a certain degree of brightness difference but when formula (7)(a) is established, namely, when the $P_{max \cdot actual}$ is within a certain range, there is no counter-light condition and a proper exposure level exists in the vicinity of the mean value. This is established even if the photoelectric output on the high brightness side or on the low brightness side is blocked. The photoelectric output P0 is applied to the in-phase input terminals of the comparators C16 and C17, and the photoelectric outputs P1, P2, P3 and P4 are applied to the in-phase input terminals of the comparators C18, C19, C20 and C21. The output $P_{mean} + \delta H$ which is an output obtained by increasing the level of the mean value by a predetermined value is applied to the inverting input terminal of the comparator C16. The output of the comparator C16 becomes 1 when the photoelectric output P0 of the central area Dc is appreciably higher (by $\delta H$) than the mean value $P_{mean}$, and such case indicates that the central portion of the phototaking picture plane has become a light portion. On the other hand, the output $P_{mean} - \delta L$ which is an output obtained by decreasing the level of the mean value by a predetermined value is applied to the inverting input terminals of the comparators C17 through C21. The time when the outputs of the comparators C17 through C21 become 0 is the time when the photoelectric outputs P0 through P4 is appreciably lower (by $\delta L$) than the mean value $P_{mean}$, and such case indicates that the corresponding picture plane of the photoelectric outputs P0 through P4 has become a dark portion.

As is apparent from the comparators C16 and C17, P0 is transformed into binary form for standardization with respect to two standard levels in the vicinity of the mean value.

The outputs of the comparators C16, C19 and C20 and an output inverted by an M-flag inverter INV11 are applied to an AND gate AND12. The out of the AND gate AND12 becomes 1 when like formulas (8), $P_0 > P_{mean} + \delta H$    (central area Dc is a light portion)

$P_2 \geq P_{mean} - \delta L$    (lower half areas Drl, Dll are not dark portions)

$P_4 \geq P_{mean} - \delta L$ are established and M-flag is 0. Such a state is a spotlight-like condition in which the central area Dc is light while the upper half are as Dru and Dlu are dark. Therefore, formulas (8) provide the condition for judging that the major object lies in a light portion. The output of the AND gate AND12 is H-flag. When the H-flag and the output of the other inverter INV12 are 1, the analog switch 21 is closed and the first metering output PH is selected. The output of C17 enters an inverter INV13. Now, when, like formula (9), $$P_0 < P_{mean} - \delta L \quad \text{(central area } Dc \text{ is a dark portion)}$$

is established, the output of the comparator C17 is 0 and the output of the inverter INV13 becomes 1. Also, the outputs of the comparators C18 and C19 are applied to a NOR gate NOR11. When, like formulas (10), $$\left. \begin{array}{l} P_1 < P_{mean} - \delta L \\ P_2 < P_{mean} - \delta L \end{array} \right\} \text{(left half areas } Dlu \text{ and } Dll \text{ are dark)}$$

are established, the outputs of the comparators C18 and C19 are both 0 and the output of the NOR gate NOR11 becomes 1. When, like formulas (11) and (12), $$\left. \begin{array}{l} P_2 < P_{mean} - \delta L \\ P_4 < P_{mean} - \delta L \end{array} \right\} \text{(lower half areas } Drl \text{ and } Dll \text{ are dark)}$$

and $$\left. \begin{array}{l} P_3 < P_{mean} - \delta L \\ P_4 < P_{mean} - \delta L \end{array} \right\} \text{(right half areas } Dru \text{ and } Drl \text{ are dark)}$$

are established, the outputs of NOR gates NOR12 and NOR13 become 1. The outputs of the inverter INV13 and the NOR gates NOR11 through NOR13 are applied to an OR gate OR13 and, if the output of any one of these is 1, the output of the OR gate OR13 becomes 1. That is, when any of formulas (9) through (12) is established, the output of the OR gate OR13 becomes 1. The case where formula (9) is established is the case where the central portion of the picture plane whereat the major object highly probably lies is dark and in such case, it is better to adjust the exposure to the low brightness side. Conversely, however, even if the central portion of the picture plane is light, it is often attributable to the brightness of the background and in these cases, it cannot always be judged that the major object lies in the light portion. Rather, in a case such as counter-light, the brightness of the major object becomes approximate to the brightness of the lower portion of the picture plane. Consequently, when formulas (11) are established, it is advisable to judge that the major object lies in the dark portion and to select the third metering output PL. The case where formulas (10) and (12) are established is considered to be the case where photography is effected with the camera positioned lengthwisely. As described above, each of formulas (9) through (12) provides the condition for judging that the major object lies in the dark portion. At such time, the output of the OR gate OR13 becomes 1.

If there is more than a predetermined number of photoelectric outputs lower than the lower limit of metering, l-flag becomes 1. Thereupon, the output of the OR gate OR12 becomes 1 to select the first metering output PH. This is because when there is much photoelectric output indicating an output lower than the lower limit of metering there is a high probability that metering has become possible by the light poertion of part of the photoelectric element and in such case, it is better to select the high brightness side.

$$\Delta P', \text{ i.e., } P_{max\text{-}generated} - P_{min\text{-}generated}$$

is applied to the inverting input terminal of the comparator C15 and when $$\Delta P' < \gamma \quad (\gamma \text{ is a constant}) \tag{13}$$

is established, the output of the comparator C15 becomes 1. This is a case where the metered brightness difference is relatively small and in such case, collection toward the mean value side will more approximately provide a proper exposure.

The output of the comparator C15 is inverted by the inverter INV12. The output of the inverter INV12 and H-flag are applied to an AND gate AND13. The output of the AND gate AND13 becomes 1 when formula (13) is not established but H-flag is 1. That is, the output of the AND gate AND13 becomes 1 when the high brightness side is selected and the brightness difference is great, and in such case, the output of the OR gate OR12 becomes 1 and the first metering output PH is selected.

The l-flag is applied to and inverted by an inverter INV14, and the outputs of the inverter INV14 and the comparator C15 and the H-flag are applied to an AND gate AND14. The output of the AND gate AND14 becomes 1 when formula (13) is established and the H-flag is 1 and the l-flag is 0, namely, when the high brightness side is selected and the brightness difference is small, and in such case, the fourth metering output PHM, i.e., $(PH+PM)/2$, is selected.

The outputs of the OR gate OR13 and the inverters INV11 and INV14 are applied to an AND gate AND17. The output of the AND gate AND17 becomes 1 when the l-flag and M-flag are 0 and the output of the OR gate OR13 is 1, namely, when the low brightness side has been selected. Let the output of the AND gate AND17 be L-flag.

The L-flag and the output of the comparator C15 are applied to an AND gate AND15 and, when the low brightness side is selected and the brightness difference is small, the output of the AND gate AND15 becomes 1 and the fifth metering output PLM, i.e., $(PM+PL)/2$, is selected.

The L-flag and the output of the inverter INV12 are applied to an AND gate AND16. When the low brightness side is selected and the brightness difference is great, the output of the AND gate AND16 becomes 1 and the third metering output PL is selected.

The H-flag, L-flag and l-flag are applied to a NOR gate NOR4. When all of these flags are 0, the output of the NAND gate NAND10 becomes 1. It is a case where no discrimination has been effected as to whether the major object lies in a light portion or in a dark portion. At such time, the output of the OR gate OR11 becomes 1 and the second metering output PM is selected.

I claim:

1. A photometering device in a camera comprising:
    means for photometering an object field through a plurality of divided photometering areas to generate a plurality of photoelectric outputs respectively corresponding to the brightness of said plurality of divided photometering areas,
    first means for relating each of said photoelectric outputs to the position information on the object field for each of said divided photometering areas to produce an output corresponding to the brightness distribution pattern of the object field;

second means for previously classifying various brightness distribution patterns into a plurality of categories and determining which one of said categories the brightness distribution pattern obtained in said first means belongs to; and means for selecting, in dependence upon said determination result, one out of a first output corresponding to a brightness between the maximum brightness and an average brightness of the object field, a second output corresponding to said average brightness and a third output corresponding to a brightness between said average brightness and the minimum brightness of the object field to apply said selected output to at least one of an exposure control circuit and an exposure indication circuit.

2. A photometering device in a camera according to claim 1, wherein said second means includes
means for comparing each of said photoelectric outputs with an average output of said photoelectric outputs to discriminate between divided photometering areas lighter than said average brightness and divided photometering areas darker than said average brightness, and relating said lighter areas with a lighter area indication mark and said darker areas with a darker area indication mark.

3. A photometering device according to claim 2, wherein said selecting means includes,
a circuit for generating output PH as said first output, output PM as said second output and output PL as said third output as below:

$$PH = k_1 \cdot P_{max} + (1-k_1) \cdot P_{mean}$$

$$PM = P_{mean}$$

$$PL = k_2 \cdot P_{min} + (1-k_2) \cdot P_{mean}$$

where $P_{max} > PH > P_{mean}$, $P_{mean} > PL > P_{min}$, $P_{mean}$ is the average value of said plurality of photoelectric outputs and $k_1$ and $k_2$ are constants;

a classifying circuit for generating a first selection signal only in a first case where said lighter area indication mark is related to a first region corresponding to the central area of said object field, a second selection signal only in a second case where said darker area indication mark is related to said first region or a second region corresponding to the lower area of said object field, and a third selection signal in a third case other than said first and second cases; and a circuit in response to said first, second and third selection signals for selecting one of said outputs PH, PL and PM.

4. A photometering device according to claim 3, wherein said output generating circuit includes,
a circuit for outputting maximum value $P_{max}$ among said plurality of photoelectric outputs;
a circuit for outputting average value $P_{mean}$ of said plurality of photoelectric outputs; and
a circuit for outputting minimum value $P_{min}$ among said plurality of photoelectric outputs,
said average value $P_{mean}$ serves as said average output.

5. A photometering device according to claim 4, wherein said output generating circuit further comprises a circuit for controlling the application of said photoelectric outputs from said photometering means to respective ones of said maximum value, average value and minimum value outputting circuits so that photoelectric outputs above a predetermined threshold value are blocked from the outputting circuits under conditions that the number of photoelectric outputs to be blocked does not exceed a predetermined number which is smaller than the total number of said plurality of photoelectric outputs.

6. A photometering device according to claim 4, wherein said output generating circuit further comprises a circuit for controlling the application of said photoelectric outputs from said photometering means to respective ones of said maximum value, average value and minimum value outputting circuits so that photoelectric outputs above a threshold value, which corresponds to the brightness of the sun under a clear sky, are blocked from said outputting circuits, but one selected out of said plurality of photoelectric outputs is allowed to be applied to said outputting circuits when all of said plurality of photoelectric outputs are above said threshold value.

7. A photometering device according to claim 4, wherein said output generating circuit further comprises a circuit for controlling the application of said photoelectric outputs from said photometering means to respective ones of said maximum value, average value and minimum value outputting circuits so that photoelectric outputs below a threshold value, which corresponds to the lower limit of measurable brightness, are blocked from said outputting circuits.

8. A photometering device according to claim 4, wherein said average output is an approximation of one value selected from means value, central value and most frequent value of the photoelectric outputs from said selecting means.

9. A photometering device according to claim 4, wherein said output generating circuit further comprises a circuit for controlling the application of said photoelectric outputs from said photometering means to respective ones of said maximum value, average value and minimum value outputting circuits so that photoelectric outputs below a threshold value, which corresponds to the brightness of the sun at dusk, are blocked from said outputting circuits under conditions that the number of photoelectric outputs to be blocked does not exceed a predetermined number which is smaller than the total number of said plurality of photoelectric outputs.

10. A photometering device according to claim 3 further comprising:
a circuit for generating a correction signal when $P_{max} - P_{min} \leq r$ (r is constant) is satisfied and then applying the correction signal to said selection circuit.

11. A photometering device according to claim 10, wherein said generating circuit further generates output PHM as said first output and output PLM as said third output, as below:

$$PHM = w_1 \cdot PH + w_2 \cdot PM$$

$$PLM = w_3 \cdot PM + w_4 \cdot PL$$

where $PH > PHM > PM$, $w_1$ and $w_2$ are constants, $PM > PLM > PL$, and $w_3$ and $w_4$ are constants,
said selection circuit selects output PHM when said first selection signal and said correction signal are applied thereto, and output PLM when said second selection signal and said correction signal are applied thereto.

12. A photometering device according to claim 11, wherein said divided photometering areas of said photometering means consists of central, upper and lower areas of said object field, said central area corresponding to said first region and said lower area corresponding to said first region and said lower area corresponding to said second region, respectively.

13. A photometering device according to claim 10, wherein said divided photometering areas of said photometering means consists of central, left upper, right upper, and left lower and right lower areas, said central area corresponding to said first region, and one of the combinations of said right lower and left lower areas, said left upper and left lower areas and said right upper and right lower areas corresponding to said second region.

14. A photometering device according to claim 12 or 13, wherein said photometering means includes a plurality of photoelectric elements arranged in matrix structure, and said photoelectric output for each of said divided areas is obtained by composing the outputs from said photoelectric elements corresponding to each of said divided areas.

15. A photometering device in a camera comprising:
means for photometering an object field through a plurality of divided photometering areas to generate a plurality of photoelectric outputs respectively corresponding to the brightness of said plurality of divided photometering areas, said plurality of photoelectric outputs representing a brightness distribution pattern of the object field;
means for classifying various brightness distribution patterns into a plurality of categories and determining which one of said categories the brightness distribution pattern obtained from said photoelectric outputs belongs to; and
means for generating, in dependence upon the determination result, any one of a first output corresponding to a brightness between the maximum brightness and an average brightness of the object field, a second output corresponding to said average brightness and a third output corresponding to a brightness between said average brightness and the minimum brightness of the object field to apply said generated output to at least one of an exposure control circuit and an exposure indication circuit.

16. A photometering device comprising:
means for photometering an object field through a plurality of divided photometering areas to generate a plurality of photoelectric outputs respectively corresponding to the brightness of said plurality of the divided photometering areas,
means for determining the brightness distribution pattern of the object field, on the basis of said plurality of photoelectric outputs,
means for, in dependence upon said determination result, selecting one of a first output corresponding to a brightness between the maximum brightness and an average brightness of the object field, a second output corresponding to said average brightness and a third output corresponding to a brightness between said average brightness and the minimum brightness of the object field,
means for examining the conditions as defined by $$P_\alpha \leq P_{max} \leq [P]P_\beta$$

and $$\alpha \leq P_{max} - P_{min} \leq \beta$$

where $P_{max}$ and $P_{min}$ are respectively the maximum and minimum of said photoelectric outputs and $P_\alpha$, $P_\beta$, $\alpha$ and $\beta$ are respectively constants, and
means for transmitting, as an operation signal for at least one of an exposure control circuit and exposure indication circuit, the one selected by said selecting means when said conditions are not met, and transmitting said second output when said conditions are met, no matter which one said selecting means selects.

17. A photometering device in a camera comprising:
means for photometering an object field through a plurality of divided photometering areas to generate a plurality of photoelectric outputs respectively corresponding to the brightness of said plurality of divided photometering areas;
means for determining an average brightness of the object field on the basis of said plurality of photoelectric outputs;
means for examining, on the basis of at least one photoelectric output corresponding to the central part of the object field and photoelectric outputs corresponding to the peripheral part of said object field, whether said central part is lighter than said average brightness of said object field or darker than said average brightness of said object field; and
means for generating, on the basis of the output of said examining means which represents whether the brightness of the central part of the object field is lighter or darker than said average brightness, an exposure information signal out of said plurality of photoelectric outputs to be used in at least one of an exposure control circuit and an exposure indication circuit.

18. A photometering device in a camera according to claim 17, wherein
said examining means comprises
means for generating a first referential output corresponding to $P_{mean} + \delta H$ and a second referential output corresponding to $P_{mean} - \delta L$, respectively, where $P_{mean}$ is the average value of said photoelectric outputs, $\delta H$ and $\delta L$ are constants:
first detecting means for detecting whether or not a photoelectric output ($P_o$) corresponding to said central part of the object field exceeds said first referential output and generating a signal representing that said central part of the object field is lighter than said average brightness when said photoelectric output ($P_o$) exceeds said first referential output; and
second detecting means for detecting whether or not said photoelectric output ($P_o$) is less than said second referential output and generating a signal representing that said central part of the object field is darker than said average brightness when said photoelectric output ($P_o$) is less than said second referential output.

19. A photometering device comprising:
means for photometering an object field through a plurality of separately divided photometering areas and generating a plurality of photoelectric outputs respectively corresponding to the brightnesses of said plurality of divided photometering areas;

first means for detecting the maximum value among photoelectric outputs applied thereto;

second means for detecting an average value of photoelectric outputs applied thereto;

third means for detecting the minimum value among photoelectric outputs applied thereto;

means for detecting whether or not said photoelectric outputs exceed a predetermined threshold value and selecting photoelectric outputs to be applied to said first, second and third detecting means from said photometering means according to the number of photoelectric outputs which exceed said predetermined threshold value; and means for generating exposure information which is used in at least one of exposure control operation and exposure indication operation, on the basis of said maximum value, average value and minimum value.

* * * * *

UNITED STATES PATENT AND TRADEMARK OFFICE
CERTIFICATE OF CORRECTION

PATENT NO. : 4,476,383      Page 1 of 2
DATED     : October 9, 1984
INVENTOR(S) : TORU FUKUHARA, ET AL.

It is certified that error appears in the above-identified patent and that said Letters Patent is hereby corrected as shown below:

Column 2, lines 51-52, change "emboidment" to --embodiment--.

Column 3, lines 34-35, delete "can be obtained as a whole if exposure control";

line 50, change "avarage" to --average--.

Column 4, line 35, change "Po" to --$P_0$--;
　　　　　line 37, change "Po" to --$P_0$--;
　　　　　line 41, change "Po" to --$P_0$--;
　　　　　line 44, change "Po" to --$P_0$--;
　　　　　line 47, change "Po" to --$P_0$--.

Column 5, line 5, change "Po" to --$P_0$--;
　　　　　line 8, change "Po" to --$P_0$--;
　　　　　line 6, change "$p_{n-1}$" to --$P_{n-1}$--;
　　　　　line 15, change "matnitude" to --magnitude--.

Column 7, line 42, change "emboidment" to --embodiment--.

Column 8, line 1, change "secreen" to --screen--;
　　　　　line 15, change "thorugh" to --through--;
　　　　　line 17, change "($P_{0+p1}$" to --($P_0$+ $P_1$--;
　　　　　line 21, change "thorugh" to --through--;
　　　　　line 22, change "volrage" to --voltage--.

Column 9, line 6, change "brighness" to --brightness--;
　　　　　line 67, change "eatablished" to --established--.

Column 10, line 5, delete "when" (second occurrence).

UNITED STATES PATENT AND TRADEMARK OFFICE
CERTIFICATE OF CORRECTION

PATENT NO. : 4,476,383      Page 2 of 2
DATED      : October 9, 1984
INVENTOR(S) : TORU FUKUHARA, ET AL.

It is certified that error appears in the above-identified patent and that said Letters Patent is hereby corrected as shown below:

Column 13, line 49, change "p0" to --$P_0$--;
           line 58, change "calssifying" to --classifying--.
Column 15, line 3, after "on" delete "o".
Column 17, line 60, change "thorugh" to --through--.
Column 18, line 63, change "resisrance" to --resistance--.
Column 19, line 9, change "noneconductive" to --non-conductive--;
           line 22, change "blockins" to --blockings--.
Column 20, lines 39-43, take out of italics "which is an . . . . through C21 become 0";
           line 54, change "out" to --output--.
Column 21, line 66, change "poertion" to --portion--.

Signed and Sealed this

Ninth Day of April 1985

[SEAL]

Attest:

DONALD J. QUIGG

Attesting Officer     Acting Commissioner of Patents and Trademarks